United States Patent [19]
Liu et al.

[11] Patent Number: 5,801,619
[45] Date of Patent: Sep. 1, 1998

[54] ANALOG SIGNAL PROCESSING SYSTEM AND DECISION LOGIC FOR CONTROLLING AIRBAG DEPLOYMENT

[75] Inventors: Jiyao Liu; Jon Paul Kelley, both of Kokomo, Ind.

[73] Assignee: Delco Electronics Corp., Kokomo, Ind.

[21] Appl. No.: 927,588

[22] Filed: Sep. 11, 1997

Related U.S. Application Data

[63] Continuation-in-part of Ser. No. 610,021, Mar. 4, 1996.
[51] Int. Cl.$^6$ ............................................. B60Q 1/00
[52] U.S. Cl. ......................... 340/436; 340/903; 340/429; 701/45; 701/47
[58] Field of Search .................... 340/436, 429, 340/665, 669; 280/735, 734; 180/268; 207/29, 33, 34, 36, 45, 46, 47

[56] References Cited

U.S. PATENT DOCUMENTS

| | | | |
|---|---|---|---|
| 5,285,187 | 2/1994 | Hirao et al. | 340/436 |
| 5,436,838 | 7/1995 | Miyamori | 364/424.05 |
| 5,445,413 | 8/1995 | Rudolf et al. | 280/735 |
| 5,629,847 | 5/1997 | Shirakawa et al. | 340/436 X |
| 5,737,224 | 4/1998 | Jeenicke et al. | 340/436 X |

*Primary Examiner*—Jeffery A. Hofsass
*Assistant Examiner*—Daryl C. Pope
*Attorney, Agent, or Firm*—Jimmy L. Funke

[57] ABSTRACT

An analog signal processing system and decision logic for controlling airbag deployment includes low pass filter circuitry, differentiation circuitry and integration circuitry operable to receive an analog acceleration signal and provide a differentiated analog bandpass acceleration signal, a reduced bandpass analog acceleration signal, a low pass analog acceleration signal, an analog velocity signal and an analog displacement signal. An interface circuit receives the foregoing analog signals and converts such signals to a number of logic level signals based on comparison with a number of predefined analog threshold signals. A decision logic circuit receives the converted logic level signals and processes such signals to discriminate between severe and non-severe impact events, and control airbag deployment in accordance therewith.

40 Claims, 11 Drawing Sheets

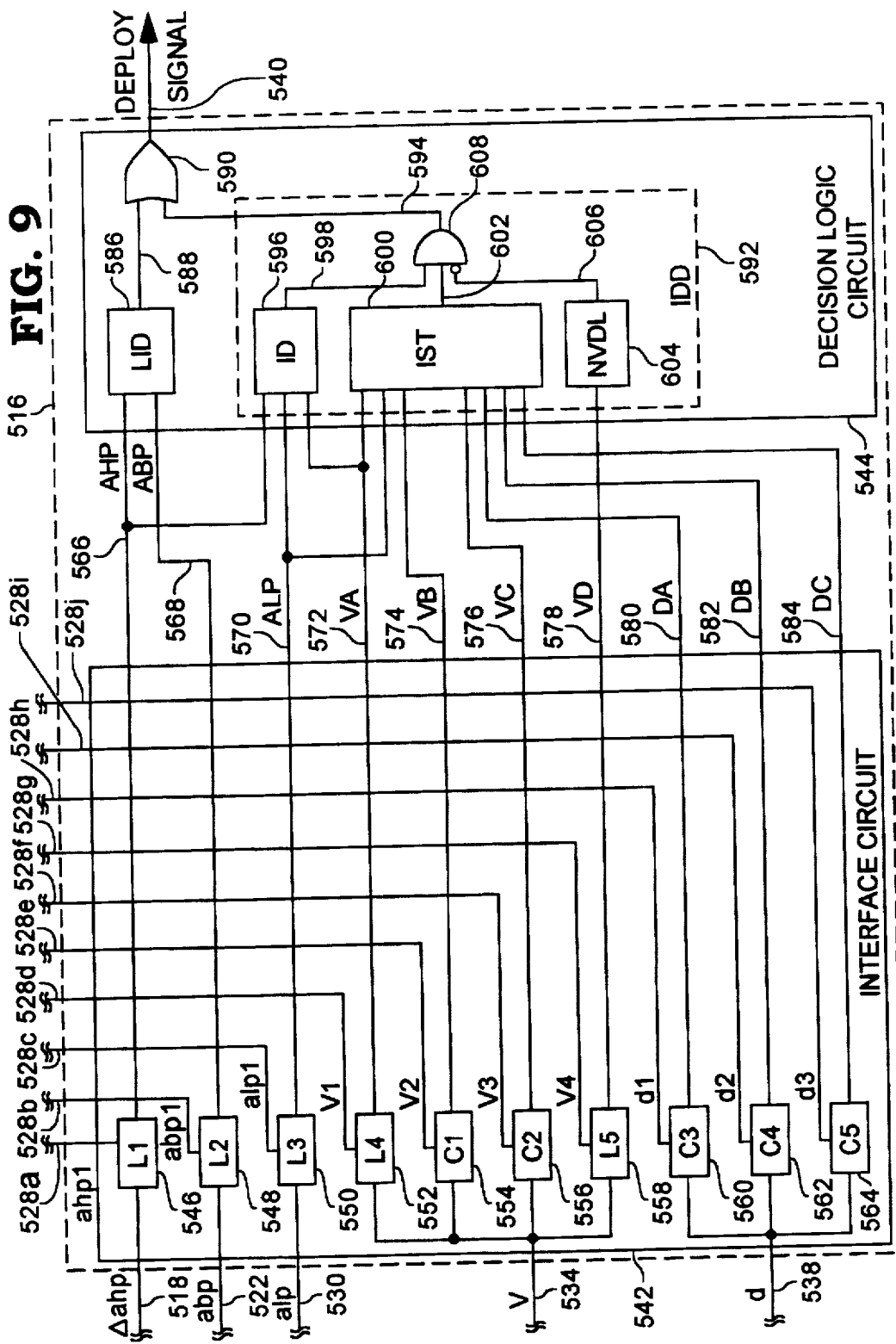

ANALOG SIGNAL PROCESSING SYSTEM AND DECISION LOGIC FOR CONTROLLING AIRBAG DEPLOYMENT

CROSS-REFERENCE TO RELATED APPLICATION

The present application is a continuation-in-part of copending U.S. application Ser. No. 08/610,021 filed Mar. 4, 1996, and entitled ANALOG SIGNAL PROCESSING SYSTEM FOR DETERMINING AIRBAG DEPLOYMENT.

BACKGROUND OF THE INVENTION

The present invention relates generally to techniques for processing analog signals, and more specifically to systems for processing analog accelerometer signals for determining air bag deployment.

Air bag systems are commonly used in automotive applications to provide protection for the vehicle operator and/or passenger in the event of a vehicular collision. A popular technique for implementing an air bag system includes detecting vehicular acceleration via an accelerometer and then evaluating the resulting acceleration signal to determine whether an impact of sufficient severity has occurred to require the air bag to deploy.

Most acceleration-based air bag systems utilize a microprocessor to evaluate the acceleration signal. As is known in the art, such microprocessor use permits evaluation algorithms to be easily implemented in software. In so doing, the input analog acceleration signal is converted to a digital word, and all subsequent signal processing by the microprocessor is implemented digitally.

An example of one known prior art microprocessor-based system for evaluating an acceleration signal is shown in FIG. 1 as system 10. Referring to FIG. 1, system 10 includes an accelerometer 12 which may be a micro-machined piezoresistive sensor whose differential analog output voltage (S+ − S− = $V_{IN}$) is proportional to the applied acceleration. The differential acceleration signals S+ and S− are applied to signal conditioning circuitry 14 via signal lines 16 and 18, respectively. The signal conditioning circuitry typically includes a gain stage and temperature compensation circuitry, and provides a conditioned acceleration signal $V_{OUT}$ at output 20. A microprocessor 24 is provided to evaluate $V_{OUT}$ and includes an input 22 connected to output 20 via signal path 26. Microprocessor 24 receives the conditioned analog acceleration signal $V_{OUT}$, converts the analog signal to a digital signal, and implements a software algorithm to evaluate the digital signal and determine whether the air bag should be deployed. Microprocessor 24 then controls air bag deployment circuitry via signal path 28.

Software algorithms for evaluating acceleration signals to determine air bag deployment may be implemented in a number of ways. A conventional approach is to use a time-dependent algorithm wherein the algorithm begins when a predefined level of acceleration is exceeded. With the time-dependent approach, the digital acceleration signal is digitally integrated within microprocessor 24, and the resulting predetermined velocity curve is evaluated against a predetermined curve to determine if a deploy event has occurred. Referring to FIG. 2, a known prior art example of this approach is shown graphically. FIG. 2 shows a plot of velocity versus time wherein curve 30 represents the maximum velocity allowed before a deploy is required, and curve 40 represents a velocity below which a deploy event should not occur and below which system 10 is reset. The break points and relative slopes of curves 30 and 40 can be adjusted by software to optimize system 10 for various vehicular applications. Additional breakpoints and slopes can be added, so long as there is sufficient memory in microprocessor 24 to store such data.

The foregoing microprocessor-based system and implementation thereof has a number of drawbacks. First, system 10 is designed around a process optimized for digital circuits, which requirements are inconsistent with the requirements for processing of analog signals such as those provided by analog accelerometer 12. Second, microprocessors are typically large and complicated integrated circuits, resulting in significant cost and area penalties for the circuit and system designers. Third, variations in the accuracy of accelerometer 12, along with the finite resolution of the data converter of microprocessor 24, requires curves 30 and 40 of FIG. 2 to be some minimum distance apart. This limits the accuracy of the algorithm and may delay a deployment of the air bag beyond the time when deployment should actually occur. Moreover, the finite resolution of the data converter of microprocessor 24 introduces error into the algorithm which can be cumulative, and in some cases unacceptable. Fourth, most low cost microprocessors process data at a relatively slow rate. This limits the number of break points and slopes which can be used in a time-dependent algorithm, which may then result in missing important information which occurs at too rapid a rate for the digital system to handle (known in the art as aliasing).

To avoid the foregoing drawbacks of a microprocessor-based acceleration signal evaluating system, it is desirable to implement an analog signal processing system for evaluating the analog acceleration signal. However, implementation of a time-dependent analog algorithm is a difficult task and very area intensive in the design of integrated circuitry to accomplish such an algorithm. What is therefore needed is an analog signal processing system implementing a time-independent algorithm to thereby eliminate or minimize the resolution constraints associated with data converters, and significantly reduce timing uncertainty and aliasing problems. An added benefit of implementing a time-independent algorithm is that it avoids secondary events, such as hitting a curb, for example, having any effect on the analog deployment algorithm.

SUMMARY OF THE INVENTION

The forgoing shortcomings of the prior art are addressed by the present invention. In accordance with one aspect of the present invention, circuitry for generating an airbag deployment signal from an analog acceleration signal comprises a first filter circuit receiving an analog acceleration signal and providing a first filtered analog signal as a first predefined frequency band thereof, a differentiation circuit receiving the first filtered analog signal and providing a differentiated analog signal therefrom, a second filter circuit receiving the first filtered analog signal and providing a second filtered analog signal as a second predefined frequency band thereof, and a decision circuit receiving the differentiated analog signal and the second filtered analog signal, and providing an airbag deployment signal therefrom.

In accordance with another aspect of the present invention, circuitry for generating an airbag deployment signal from an analog acceleration signal comprises a filter circuit receiving an analog acceleration signal and providing a first filtered analog signal as a first predefined frequency band thereof, and a second filtered analog signal as a second predefined frequency band thereof, a differentiation circuit receiving the first filtered analog signal and providing a differentiated analog signal therefrom, a first integration circuit receiving the second filtered analog signal and providing a first integrated analog signal therefrom, and a decision circuit receiving the differentiated analog signal, the second filtered analog signal and the first integrated analog signal, and providing an airbag deployment signal therefrom.

In accordance with a further aspect of the present invention, a method of operating a supplemental inflatable restraint system of a vehicle including an inflatable airbag, the method comprises the steps of sensing vehicle acceleration rate information, and deploying a supplemental inflatable restraint device if (A) the vehicle acceleration rate information indicates a force loading rate in excess of a threshold force loading rate and the vehicle acceleration rate information contains an energy level above a predefined energy level, OR (B) the vehicle acceleration rate information indicates a force loading rate in excess of a threshold force loading rate prior to an impact energy in excess of a first impact energy level threshold, and an impact force in excess of a first impact force threshold.

One object of the present invention is to provide an analog signal processing system responsive to an analog acceleration signal for controlling supplemental inflatable restraint deployment.

Another object of the present invention is to provide a system for controlling supplemental inflatable restraint deployment based on a systematic analysis of impact kinetics and kinematics.

A further object of the present invention is to provide such a system which does not require or include a digital computer or similar digital signal processing system.

Yet another object of the present invention is to provide a time-independent technique for processing analog acceleration signals to determine supplemental inflatable restraint deployment conditions.

These and other objects of the present invention will become more apparent from the following description of the preferred embodiments.

BRIEF DESCRIPTION OF THE DRAWINGS

FIG. 9 is a diagrammatic illustration of one embodiment of the decision circuitry of FIG. 8, in accordance with the present invention.

DESCRIPTION OF THE PREFERRED EMBODIMENTS

Figure 1:
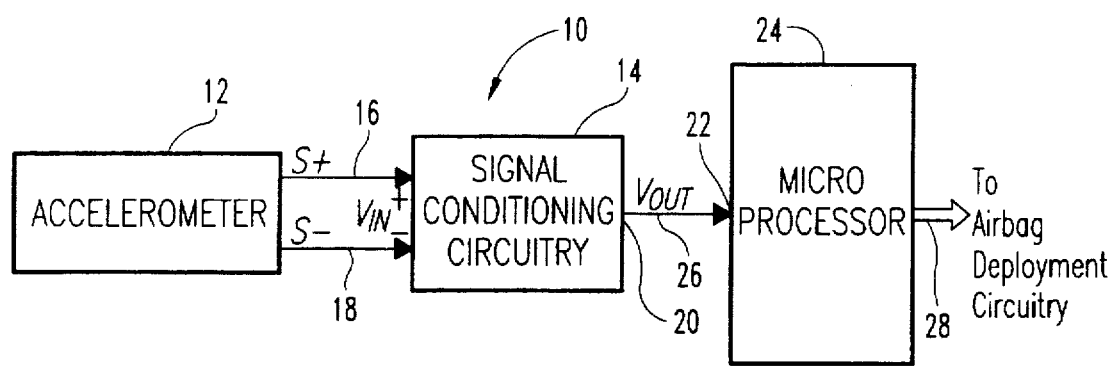
FIG. 1 is a diagrammatic illustration of a prior art system for evaluating analog acceleration signals utilizing a digital microprocessor.
Figure 2:
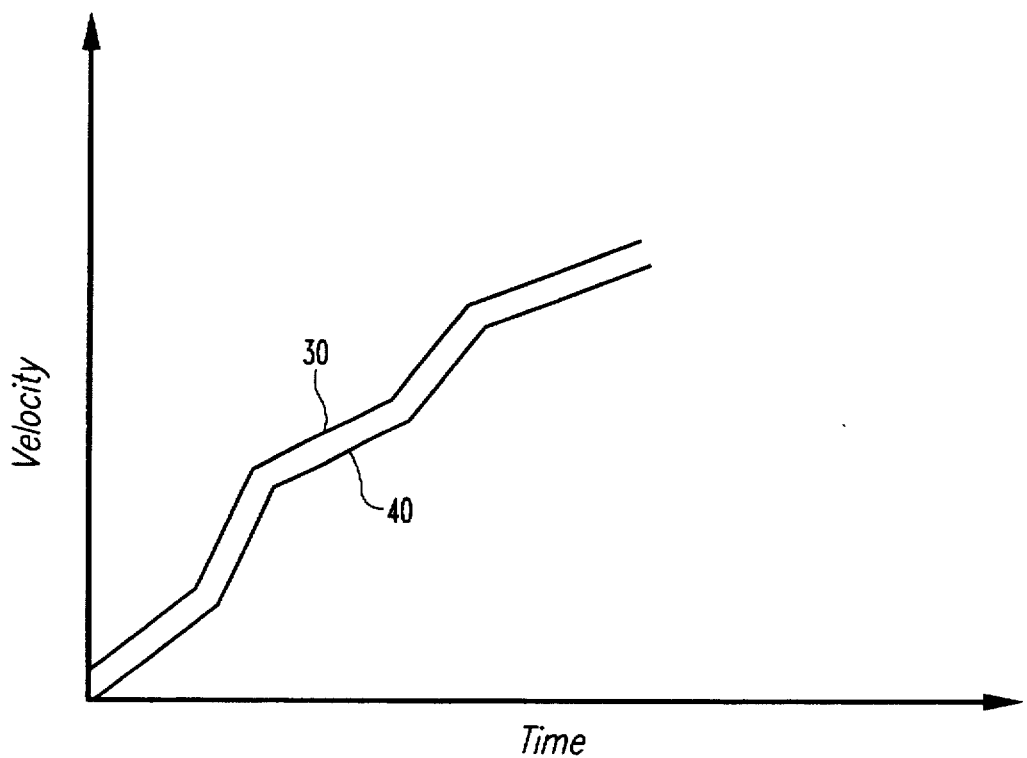
FIG. 2 is a plot illustrating a prior art time dependent algorithm utilized by the system of FIG. 1 in evaluating acceleration signals.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Figure 3:
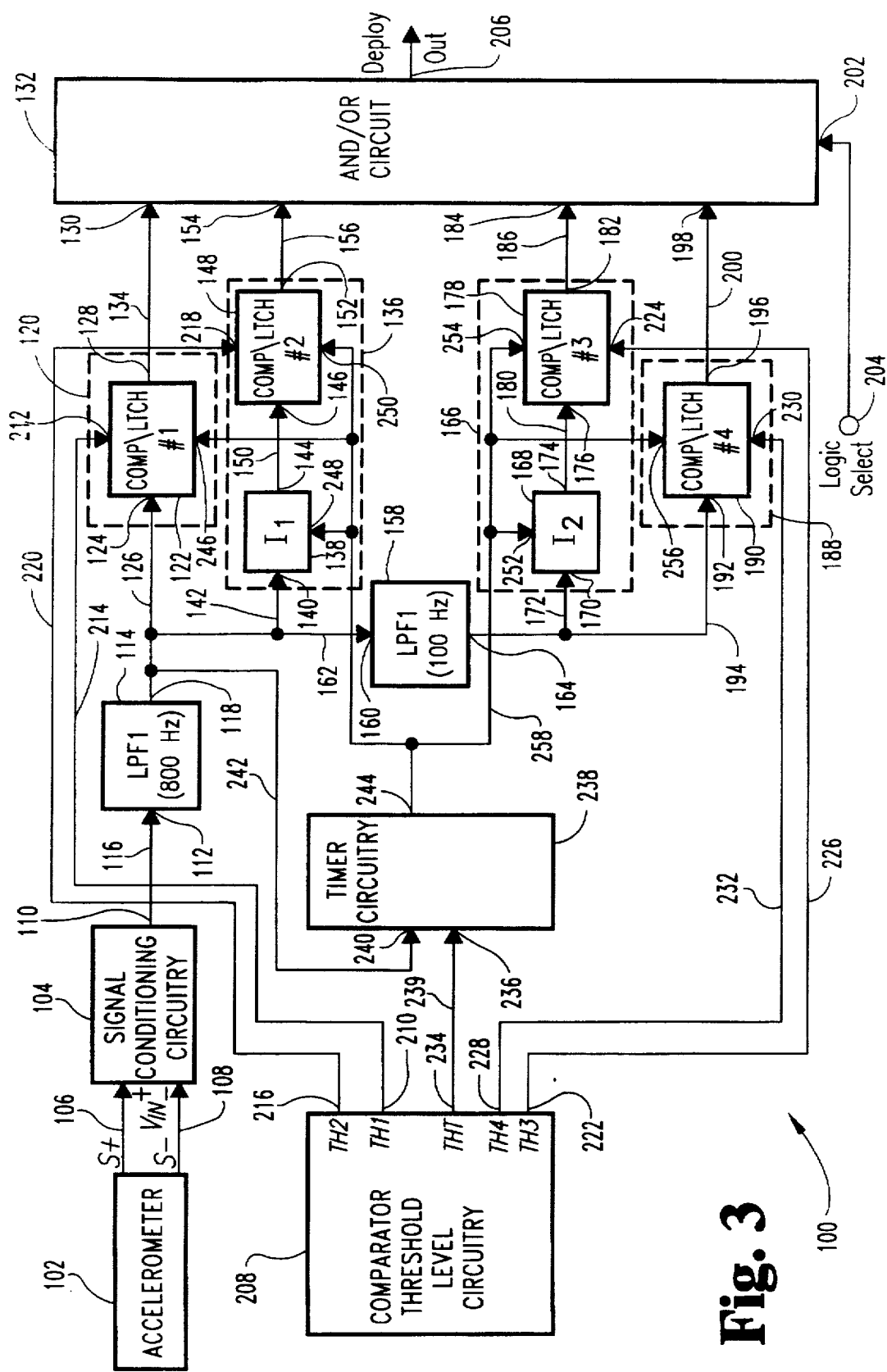
FIG. 3 is a diagrammatic illustration of one embodiment of an analog signal processing system for determining air bag deployment, in accordance with the present invention.

Referring now to FIG. 3, a diagrammatic illustration of one embodiment of an analog signal processing system 100 for determining air bag deployment, in accordance with the present invention, is shown. System 100 includes an accelerometer 102 connected to signal conditioning circuitry 104 via signal paths 106 and 108. Accelerometer 102 is responsive to acceleration to provide a differential acceleration signal, S+ and S−, corresponding thereto. Preferably, accelerometer 102 is a bulk micro-machined piezoresistive sensor, although the present invention contemplates that any acceleration sensor may be used having a differential output that is proportional to the applied acceleration. Signal conditioning circuitry 104 is operable to receive differential acceleration signals S+ and S− as an input voltage $V_{IN}$, where $V_{IN}=(S+)-(S-)$, and provide a conditioned analog acceleration signal at output 110 corresponding thereto. Preferably, signal conditioning circuitry 104 includes signal amplifying circuitry having, an adjustable gain associated therewith, along with compensation circuitry for minimizing undesirable components of the differential analog acceleration signal, such as those due to acceleration-independent offsets, temperature, circuit fabrication variations, and the like. One example of such signal conditioning circuitry 104 designed for use with system 100 is described in U.S. patent application Ser. No. 08/610,007, filed Mar. 4, 1996 and entitled "Analog/Digital Feedback Circuitry for Minimizing Offset Variations in an Analog Signal", which is assigned to the assignee of the present invention, and which patent application is herein incorporated by reference.

System 100 further includes a low pass filter 114 having an input 112 connected to the output 110 of signal conditioning circuitry 104 via signal path 116. Low pass filter 114 is operable to remove undesired resonant frequency effects from the conditioned analog acceleration signal provided by signal conditioning circuitry 104, which undesirable resonant frequency effects typically occur beyond 1.5 kHz in a piezoresistive sensor. Preferably, low pass filter 114 is a second-order 800 Hz switched capacitor low pass filter, although the present invention contemplates that the cut off frequency of low pass filter 114 may be set at any frequency below the undesirable resonant frequency. Low pass filter 114 includes an output 118 from which low pass filter 114 provides the analog acceleration signal suitable for evaluation by the remaining analog signal processing components of system 100.

In evaluating the analog acceleration signal provided by low pass filter 114, system 100 includes a number of analog signal processing circuits that may be used by system 100 in various combinations thereof, as will be fully described hereinafter, to generate an air bag deployment signal therefrom. One such analog signal processing circuit 120 preferably includes a comparator/latch circuit 122 having an input 124 connected to the output 118 of low pass filter 114 via signal path 126. Comparator/latch circuit 122 further includes an output 128 connected to an input 130 of AND/OR circuit 132 via signal path 134. The details of comparator/latch circuit 122 will be more fully described hereinafter with respect to FIG. 5.

Another analog signal processing circuit 136 is connected to the output 118 of low pass filter 114 via signal path 142. Preferably, analog signal processing circuit 136 includes an analog signal integrating circuit 138 of known construction, having an input thereto 140 connected to output 118 of low pass filter 114 via signal path 142. An output 144 of analog signal integrating circuit 138 is connected to an input 146 of comparator/latch circuit 148 via signal path 150. Comparator/latch circuit 148 has an output 152 connected to a second input 154 of AND/OR circuit 132 via signal path 156. Preferably, comparator/latch circuit 48 is identical to comparator/latch circuit 120, the details of which will be fully described hereinafter.

Output 118 of low pass filter 114 is further connected to an input 160 of a second low pass filter 158 via signal path 162. Preferably, low pass filter 158 is designed to have a lower cut off frequency than low pass filter 114, so that low pass filter 158 receives the analog acceleration signal from low pass filter 114 and provides a low frequency representation thereof. In one embodiment, low pass filter 158 is a first-order 100 Hz switched capacitor low pass filter, although the present invention contemplates that the cut off frequency of low pass filter 158 may be designed to be any frequency lower than the cut off frequency of low pass filter 114, to thereby provide a low frequency representation of the analog acceleration signal at output 164 thereof.

The low frequency representation of the analog acceleration signal is applied to analog signal processing circuit 166 via signal path 172. Preferably, analog signal processing circuit 166 is identical to analog signal processing circuit 136 in that the low frequency representation of the analog acceleration signal is applied to an input 170 of an analog signal integrating circuit 168 of known construction. An output 174 of analog signal integrating circuit 168 is connected to an input 176 of a comparator/latch circuit 178 via signal path 180. Comparator/latch circuit 178 has an output 182 connected to a third input 184 of AND/OR circuit 132 via signal path 186. Preferably, analog signal integrating circuit 168 is identical to analog signal integrating circuit 138, and comparator/latch circuit 178 is identical to comparator/latch circuits 120 and 148.

The low frequency representation of the analog acceleration signal provided at the output 164 of low pass filter 158 is further provided to analog signal processing circuit 188 via signal path 194. Analog signal processing circuit 188 preferably includes a comparator/latch circuit 190 having an input 192 thereto connected to output 164 of low pass filter 158 via signal path 194. Comparator/latch circuit 190 has an output 196 connected to a fourth input 198 of AND/OR circuit 132 via signal path 200. Preferably, comparator/latch circuit 190 is identical to comparator/latch circuits 120, 148, and 178.

As will be described in further detail hereinafter, any combination of output signals provided by the foregoing analog signal processing circuits can be used to generate the air bag deployment signal. A preferred way of combining the output signals is to provide AND/OR circuit 132 with a logic select input 202 connected to an external source of a logic select signal, represented by open connection 204. AND/OR circuit 132 is responsive to the level of the logic select signal to provide either an AND function or an OR function, with respect to the analog signal processing circuit output signals received at inputs 130, 154, 184, and 198. Thus, AND/OR circuit may be configured to provide the air bag deployment signal at a deploy output 206 thereof, which is either an ANDed version of the output signals of analog digital processing circuits 120, 136, 166, and/or 188, or an ORed version thereof. Although AND/OR circuit 132 is preferably responsive to one of a low level and high level logic select input signal at input 202 thereof to provide either an AND function or an OR function, the present invention contemplates that circuit 132 may further be responsive to any one of a plurality of logic select input signal levels at logic select input 202 to perform any one of a corresponding plurality of separate logic operations upon the output signals of the various analog signal processing circuits to thereby generate the air bag deployment signal therefrom. Such plurality of logic functions may include, but are not limited to, inversion, NAND, NOR, exclusive-OR, exclusive-NOR, and/or any combination thereof.

As will be more fully described hereinafter, each of the comparator/latch circuits 120, 148, 178, and 190 has an analog reference threshold level associated therewith, which analog reference threshold levels are preferably provided by comparator threshold level circuitry 208. Comparator threshold level circuitry 208 includes a TH1 output 210 connected to a reference signal input 212 of comparator/latch circuit 122 via signal path 214, a TH2 output 216 connected to a reference signal input 218 of comparator/latch circuit 148 via signal path 220, a TH3 output 222 connected to a reference signal input 224 of comparator/latch circuit 178, and a TH4 output 228 connected to a reference signal input 230 of comparator/latch circuit 190 via signal path 132. The reference threshold level signals provided at outputs 210, 216, 222, and 228 are each analog reference signals operable to provide a switching threshold reference signal to each of the foregoing comparator/latch circuits. Preferably, comparator threshold level circuitry 208 is a digital-to-analog (D/A) converter of known construction and responsive to digital input signals thereto to provide corresponding analog reference signals therefrom at outputs 210, 216, 222, and 228. However, the present invention further contemplates that other known analog circuits may be used to provide the foregoing analog reference signals, which circuits may include, for example, resistor divider networks.

Preferably, system 100 has a timer reset associated therewith, and system 100 operation is not initiated until a predetermined acceleration threshold has been detected. System 100 is thereafter only active for a predetermined period of time, and if a deploy event has not occurred within the predetermined period of time, system 100 is held in reset until the predetermined acceleration threshold is again detected. In one embodiment, the predetermined time period that system 100 is active after determining that the predetermined acceleration threshold has been detected is set at approximately 35 milliseconds, although the present invention contemplates that system 100 may be provided with a wide range of active time periods. Specifically, the predetermined active time period may be set extremely small such that system 100 effectively samples the analog acceleration signal provided by low pass filter 114, or may be set to run continuously such that system 100 is always active. The present invention contemplates that the active time period of system 100 may be set anywhere between the foregoing limits to provide the system designer with added flexibility.

In implementing the foregoing timing reset function, system 100 includes a timer circuit 238 having an input 240 connected to the output 118 of low pass filter 114 via signal path 242. Timer circuit 238 includes an additional input 236 connected to a THT output 234 of comparator threshold level circuitry 208 via signal path 239. Timer circuit 238 further includes an output 244 connected to circuit enable inputs 246 of comparator/latch 122, 248 of analog signal integrating circuit 138, 250 of comparator/latch circuit 148, 252 of analog signal integrating circuit 168, 254 of comparator/latch circuit 178, and 256 of comparator/latch circuit 190. As will be more fully described with respect to FIG. 4, timer circuit 238 receives the analog acceleration signal provided by low pass filter 114 and an analog reference signal provided by comparator threshold level circuitry 208, and provides a circuit enable output signal at output 244 thereof to thereby enable comparator/latch 122, analog signal integrating circuit 138, comparator/latch 148, analog signal integrating circuit 168, comparator/latch 178, and comparator/latch 190 for the predetermined time period discussed above when the analog acceleration signal exceeds a predetermined acceleration threshold level.

Figure 4:
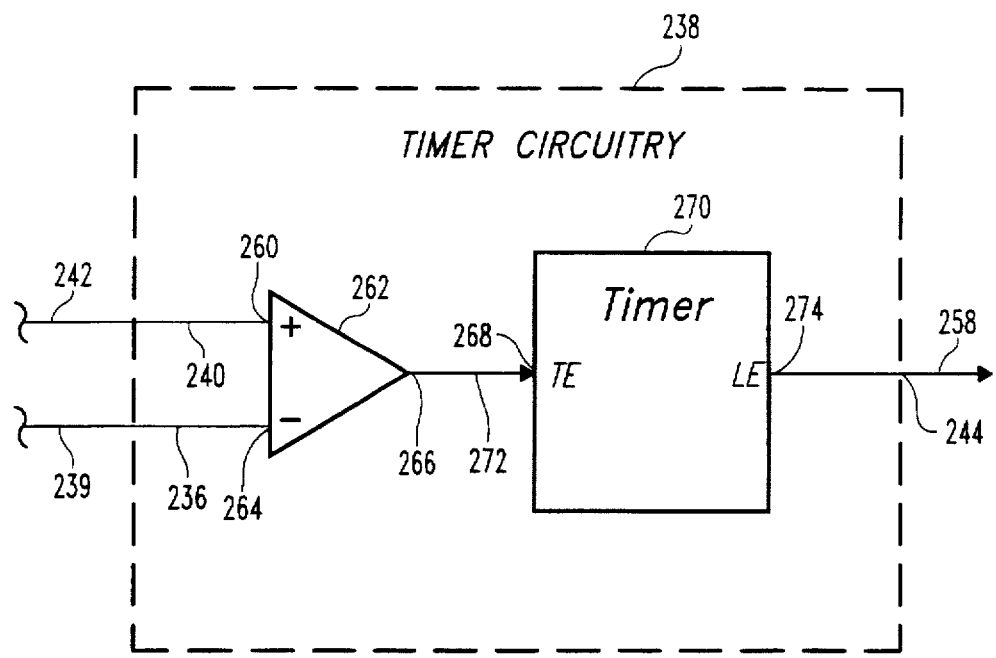
FIG. 4 is a diagrammatic illustration showing the details of the timer circuitry of FIG. 3.

Referring now to FIG. 4, one embodiment of timer circuit 238 is shown. Input line 240, connected to signal path 242, is preferably connected to a non-inverting input 260 of a comparator 262 of known construction. Similarly, input 236, connected to signal path 239, is connected to an inverting input 264 of comparator 262. An output 266 of comparator 262 is connected to a timer enable input 268 of timer 270 via signal path 272. Timer 270, which may be of known construction, has a circuit enable output 274 which provides the aforementioned circuit enable signal at output 244 connected to signal path 258. In operation, comparator 262 is responsive to the analog acceleration signal provided at output 118 of low pass filter 114, and to the analog reference signal provided on signal path 239 by comparator threshold level circuitry 208, to provide a low level signal at output 266 when the analog reference signal exceeds the analog acceleration level, and to provide a high level output signal at output 266 when the analog acceleration signal exceeds the analog reference signal. Timer 270 is responsive to a high level timer enable signal at input 268 to provide a circuit enable signal at output 274 thereof. Timer 270 is operable, as is known in the art, to provide the circuit enable signal at output 274 for only a predetermined time period after receiving a high level timer enable signal at input 268 thereof. It is to be understood that although timer circuit 238 preferably includes a comparator 262 and timer 270, operable as described, the present invention contemplates that comparator 262 may be replaced by any known level-detecting circuit similarly responsive to the analog acceleration signal and analog reference signal provided on signal paths 242 and 239, respectively, to provide the timer enable signal.

Figure 5:
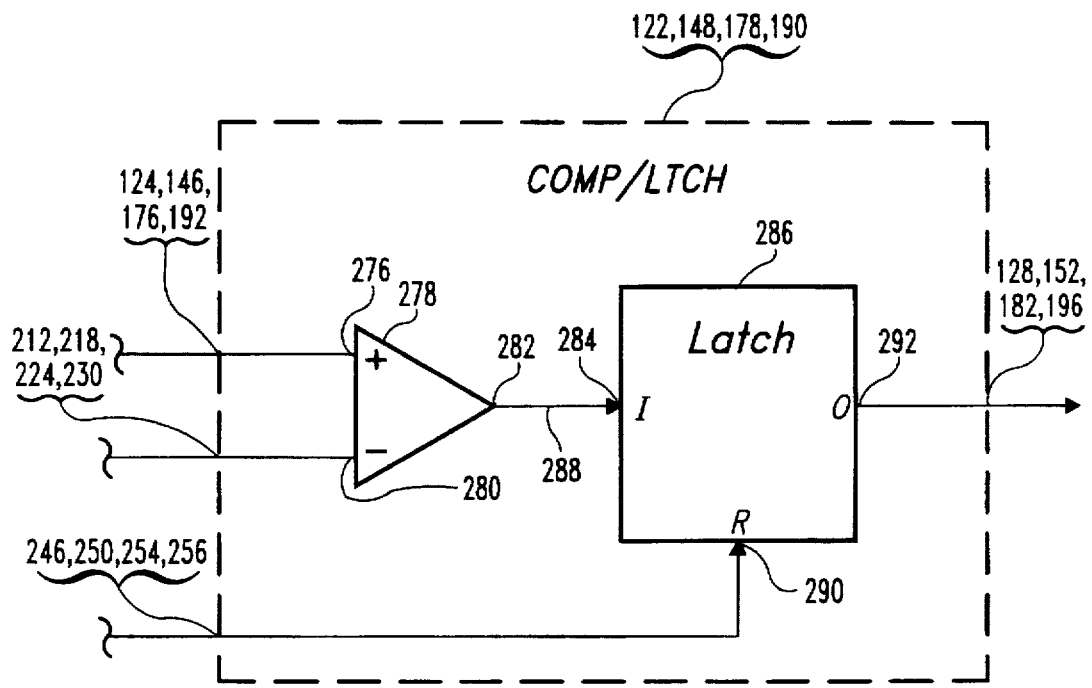
FIG. 5 is a diagrammatic illustration showing the details of the comparator/latch circuitry of FIG. 3.

Referring now to FIG. 5, one embodiment of a comparator/latch circuit, corresponding to any one of comparator/latch circuits 122, 148, 178, and 190, is shown. A first input, corresponding to one of inputs 124, 146, 176, or 192, is connected to a non-inverting input 276 of comparator 278, which may be of known construction. Similarly, a second input, corresponding to input 212, 218, 224, or 230, is connected to an inverting input 280 of comparator 278. An output 282 of comparator 278 is connected to an input 284 of latch circuit 286 via signal path 288. Latch circuit 286 may be of known construction, and includes a reset input 290 corresponding to one of inputs 246, 250, 254, or 256, which is connected to an enable input provided by timer circuit 238. Latch circuit 286 further includes an output 292 corresponding to any one of outputs 128, 152, 182, or 196. Comparator 278 is operable to provide a low level output signal at output 282 thereof when the analog reference signal at input 280 exceeds the analog signal at input 276, and to provide a high level output signal at output 282 thereof when the analog signal at input 276 exceeds the analog reference signal at input 280. When the latch circuit 286 is not in reset, corresponding to the condition that the latch circuit 286 is enabled, a high level output signal is provided at output 292 if, at any time that it is enabled, latch circuit 286 receives a high level input signal at input 284. If, during the time that latch circuit 286 is enabled, no high level input signal is received at input 284, latch circuit 286 will provide a low level output signal at output 292 thereof. During reset, corresponding to times at which latch circuit 286 is not enabled, latch circuit 286 provides a low level output signal at output 292 thereof. Thus, the comparator/latch circuit of FIG. 5 is operable, in a preferred embodiment thereof, to provide a high level output signal at output 292 only if the analog input signal, provided to any one of inputs 124, 146, 176, or 192, exceeds the analog reference signal provided at any one of corresponding inputs 212, 218, 224, or 230. In any other case, latch circuit 286 provides a low level output signal at output 292 thereof. Although the comparator/latch circuit of FIG. 5 is shown as preferably including a comparator 278 cooperatively arranged with a latch circuit 286 as described, those skilled in the art will recognize that the function of the comparator/latch circuit may be implemented with a variety of known circuits. One such circuit may include a known level detecting circuit operable to distinguish between relative levels of signals received at any one of inputs 124, 146, 176, and 192, and analog reference signals received at any one of corresponding inputs 212, 218, 224, or 230, and provide a high level output signal if one input signal exceeds the other, and to otherwise provide a low level signal. All such alternate circuit implementations for achieving the function described with respect to FIG. 5 are intended to fall within the scope of the present invention.

Those skilled in the art will recognize that any of the foregoing high/low level signal descriptions of the various comparator and latch circuits may be inverted without detracting from the scope of the present invention. For example, although comparator/latch circuit 122, according to the foregoing description, is operable to provide a high level signal at output 128 thereof only if the analog acceleration signal at input 124 exceeds the analog reference signal at input 212, comparator/latch circuit 122 can be easily modified such that a low level output signal is provided at output 128 thereof only if the analog acceleration signal at input 124 exceeds the analog reference signal at input 212.

Referring now to FIGS. 3–5, operation of system 100 will now be described in detail. The analog acceleration signal provided by low pass filter 114 is provided to input 124 of comparator/latch circuit 122, and analog reference signal TH1 provided by comparator threshold level circuitry 208 is provided to input 212 thereof. The analog reference signal TH1 applied to input 212 corresponds to a predetermined acceleration level, which may be any acceleration level between −500 g's and 500 g's. Thus, if the analog acceleration signal at input 124 exceeds the analog reference signal TH1, comparator/latch circuit 122 provides a high level signal to input 130 of AND/OR circuit 132.

The analog acceleration signal provided by low pass filter 114 is further applied to input 140 of analog signal integrating circuit 138. Analog signal integrating circuit 138 is operable to convert the analog acceleration signal provided by low pass filter 114 to an analog velocity signal. The analog velocity signal provided by analog signal integrating circuit 138 is provided to input 146 of comparator/latch circuit 148. A second analog reference signal TH2 is provided to input 218 of comparator/latch circuit 148. Analog reference signal TH2 corresponds to a predetermined velocity level, which may be set at any desired vehicle speed. Comparator/latch circuit 148 provides a high level signal to input 154 of AND/OR circuit 132 if the analog velocity signal provided by analog signal integrating circuit 138 exceeds the analog reference signal TH2.

The analog acceleration signal provided by low pass filter 114 is also applied to low pass filter 158, which provides a low frequency representation thereof. The low frequency representation of the analog acceleration signal is applied to input 170 of analog signal integrating circuit 168, which is operable to integrate the low frequency representation of the analog acceleration signal and provide an analog velocity signal corresponding thereto at output 174. The analog velocity signal provided by analog signal integrating circuit 168 is provided to input 176 of comparator/latch circuit 178, along with analog reference signal TH3. As with analog reference signal TH2, signal TH3 corresponds to a predetermined velocity level, which may be set at any desired vehicle speed. Comparator/latch circuit 178 provides a high level signal to input 184 of AND/OR circuit 132 if the analog velocity signal at input 176 thereof exceeds the analog reference signal TH3.

The low frequency representation of the analog acceleration signal is further applied to an input 192 of comparator/latch circuit 190. Analog reference signal TH4 is also applied thereto an input 230. As with the analog reference signal TH1, TH4 corresponds to a desired acceleration level, which acceleration level may be set anywhere between −500 g's and 500 g's. Comparator/latch circuit 190 provides a high level signal to input 198 of AND/OR circuit 132 only if the low frequency representation of the analog acceleration signal at input 192 thereof exceeds the analog reference signal TH4.

As previously described, timer circuit 238 is responsive to a predetermined level of acceleration to enable the circuitry of system 100 for a predetermined time period. Timer circuit 238 receives the analog acceleration signal provided by low pass filter 114 at input 240 thereof. An analog reference signal THT is provided at input 236 thereof. Analog reference signal THT corresponds to an acceleration level above which system 100 operation level is desirable, and below which system 100 operation should be reset. This acceleration level may be set anywhere between −500 g's and 500 g's, and in one embodiment is set at approximately 17 g's. Thus, if the analog acceleration signal provided by low pass filter 114 exceeds the analog reference signal THT, timer circuit 238 provides a circuit enable output signal at output 244 thereof, to thereby enable comparator/latch circuit 122, analog signal integrating circuit 138, comparator/latch circuit 148, analog signal integrating circuit 168, comparator/latch circuit 178, and comparator/latch circuit 190 for a predetermined time period.

Comparator threshold level circuitry 208 is preferably designed such that each of the comparator/latch circuits 122, 148, 178, and 190 have maximally adjustable thresholds associated therewith. Preferably, this threshold range is wide enough to permit each of the analog signal processing circuits 120, 136, 166, and 188 to be on all the time, off all the time, or have any operating threshold therebetween. Such adjustability provides the possibility of eliminating one or more of the various analog signal processing circuits 120, 136, 166, or 188 from the operation of system 100, if desired.

In accordance with the logic select signal applied at input 202 of AND/OR circuit 132, the signals at inputs 130, 154, 184, and 198 are either ANDed or ORed to provide the air bag deployment signal. The foregoing AND/OR function is intended to provide the system designer with flexibility in choosing a location to mount system 100 within a vehicle.

From the foregoing, it should now be apparent that since there is no use of time-dependent slopes in the implementation of system 100, the time-dependent problems of the digital algorithm described in the background of the invention are eliminated. The analog signal integrating circuits are preferably implemented with switched capacitor filter circuits which have a much greater resolution than a conventional 8 bit data converter. This minimizes the cumulative errors of the circuits, and especially those errors attributable to digital integrators. Low pass filters 114 and 118 are also preferably implemented with switched capacitor filter circuits, sampled at a 48 microsecond rate. This is a much faster processing rate than low-cost microprocessors can handle with any degree of algorithm complexity, which higher sampling rate minimizes aliasing problems and time delays associated with digital systems as previously described. The analog signal processing system 100 thus implements a low-cost impact sensing algorithm having superior performance over its digital signal processing predecessors.

With a he possible exception of accelerometer 102, each of the system 100 components are intended to be fabricated on a single integrated circuit. Although any suitable fabrication process may be used in forming such an integrated circuit, a known BiCMOS process is preferably used.

EXAMPLES

Figure 6A:
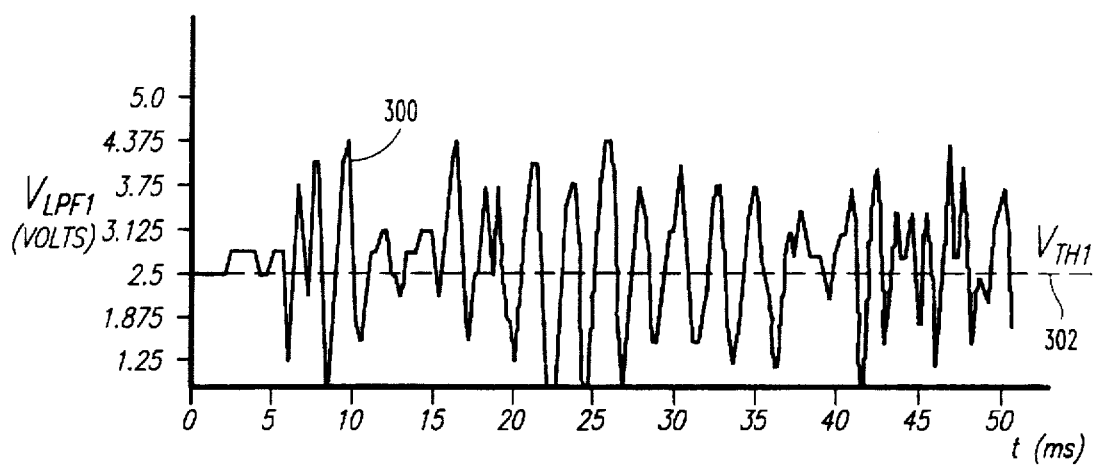
FIG. 6 is composed of FIGS. 6A–6D, and illustrates an example impact evaluated by the analog signal processing system of FIG. 3, which does not result in air bag deployment.
Figure 6B:
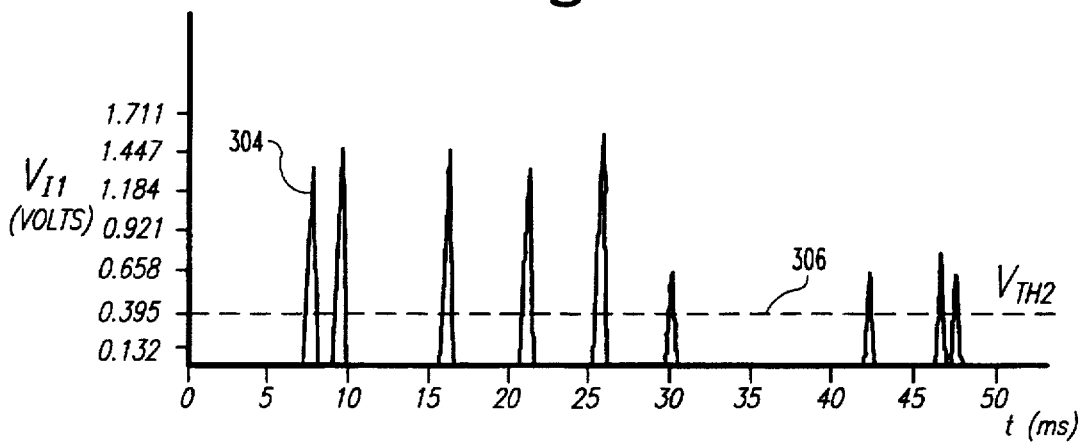

Referring now to FIG. 6, which is composed of FIGS. 6A–6D, an example is provided of an impact evaluated by system 100 of FIG. 3, which impact does not result in air bag deployment. Referring to FIG. 6A, a waveform of the analog acceleration signal 300 provided by low pass filter 114 is shown plotted versus time. In this embodiment, the analog reference signal TH1 302 is set at mid-supply such that it corresponds to a zero-g level. As such, comparator/latch circuit 122 is set such that it is permanently on. Referring now to FIG. 6B, the analog velocity signal 304 provided by analog signal integrating circuit 138 is shown plotted versus time. The analog reference signal TH2 306 is set at a low velocity level. Since the analog velocity signal 304 exceeds analog reference signal TH2, the comparator/latch circuit 148 latches, and a high level signal is provided at input 154 of AND/OR circuit 132.

Figure 6C:
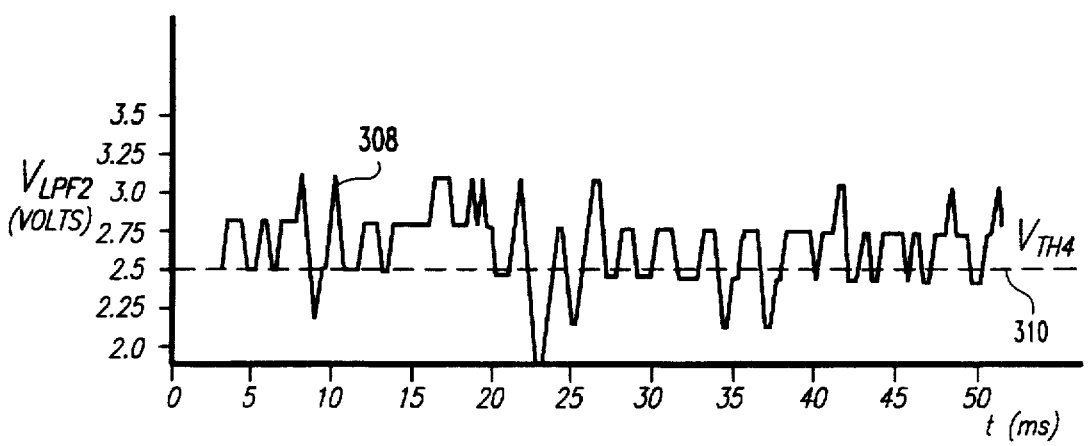
Figure 6D:
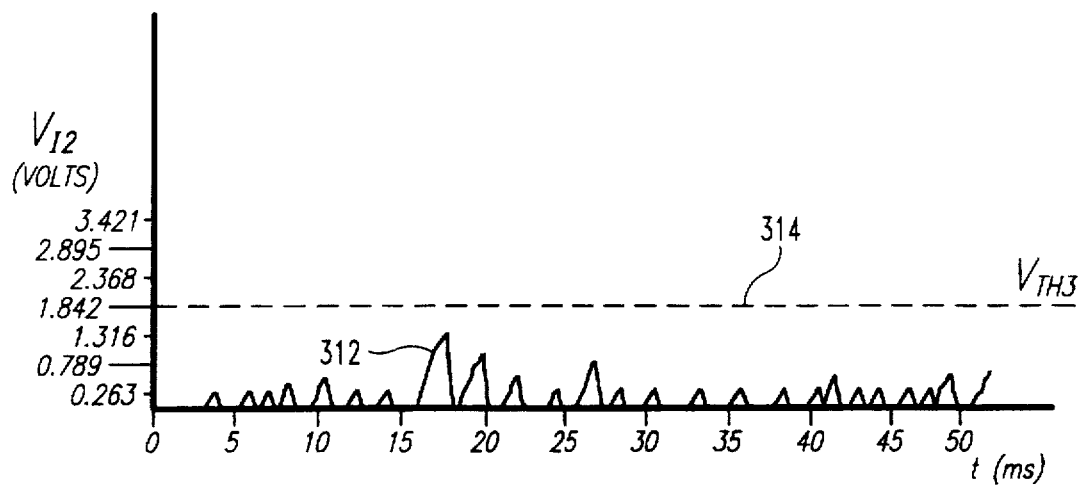

Referring now to FIG. 6C, the low frequency representation of the analog acceleration signal 308, provided by low pass filter 158, is shown plotted versus time. As with comparator/latch circuit 122, the analog reference signal TH4 of comparator/latch circuit 190 is set at a level corresponding to zero-g's. Thus, comparator/latch circuit 190 is on all the time, and provides a high level signal at input 198 of AND/OR circuit 132. Referring finally to FIG. 6D, the analog velocity signal 312 provided by analog signal integrating circuit 168 is shown plotted versus time. The analog reference signal TH3 314 is set such that it corresponds to a mid-level velocity. Since the analog velocity signal 312 does not exceed the analog reference signal TH3 314, comparator/latch circuit 176 provides a low level signal at input 184 of AND/OR circuit 132. If AND/OR circuit 132 is configured to provide the AND function, then the impact event of FIGS. 6A–6D results in a low level deploy out signal at output 206 of AND/OR circuit 132, corresponding to a non-deploy event.

Figure 7A:
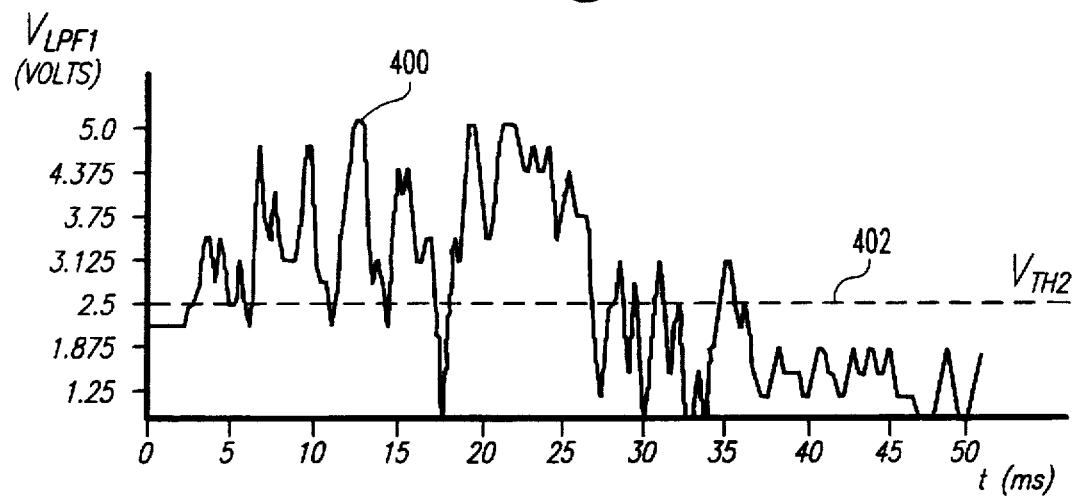
FIG. 7 is composed of FIGS. 7A–7D, and illustrates an example impact evaluated by the analog signal processing system of FIG. 3, which results in an air bag deployment.
Figure 7B:
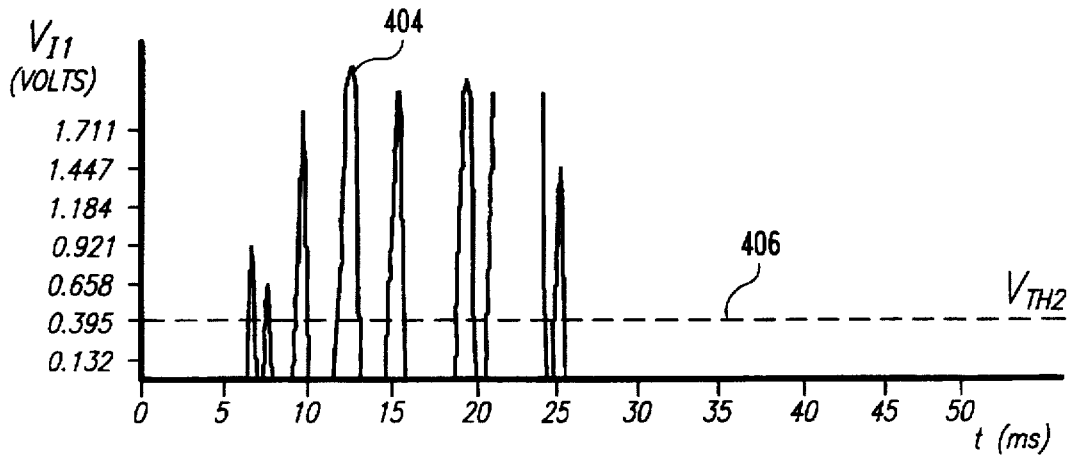

Referring now to FIGS. 7A–7D, example impact data is shown, which is evaluated by system 100 of FIG. 3, and results in an air bag deployment event. Referring specifically to FIG. 7A, the analog acceleration signal 400 provided by low pass filter 114 is shown plotted versus time. The analog reference signal TH1 is set at mid-supply, corresponding to a zero-g level. Comparator/latch circuit 122 is therefore on all the time, and provides a high level signal at input 130 of AND/OR circuit 132. Referring to FIG. 7B, the analog velocity signal 404 provided by analog signal integrating circuit 138 is shown plotted versus time. The analog reference signal TH2 406 is set such that it corresponds to a low velocity level. Since the analog velocity signal 404 exceeds analog reference signal TH2 406, comparator/latch circuit 148 provides a high level signal at input 154 of AND/OR circuit 132.

Figure 7C:
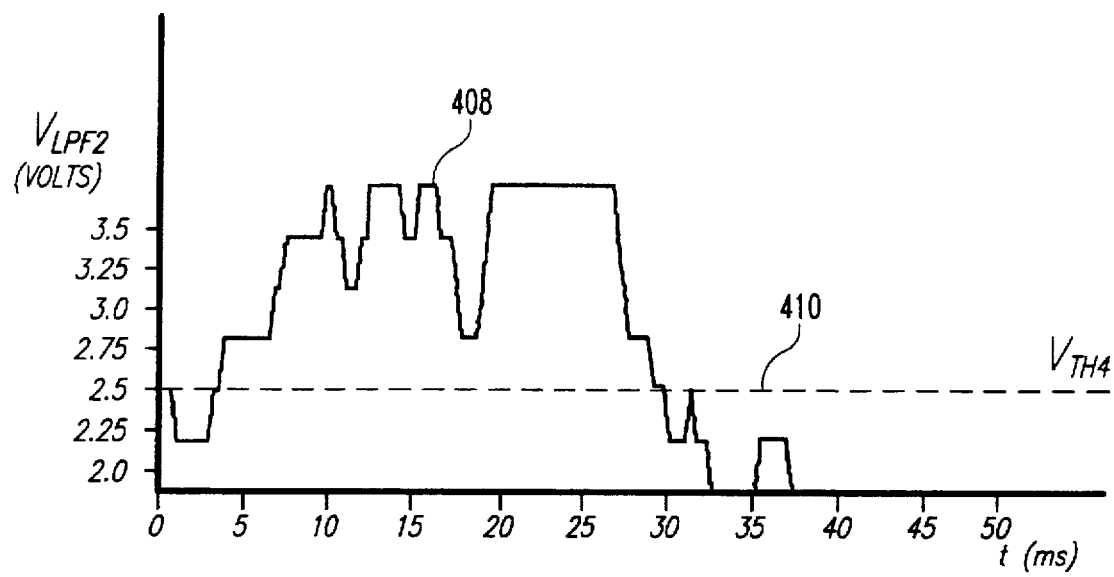
Figure 7D:
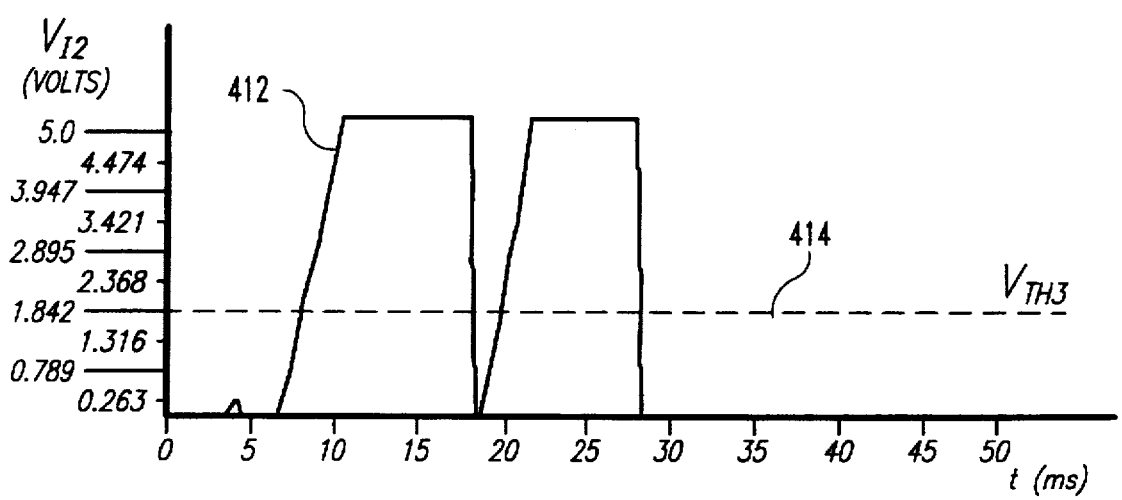

Referring to FIG. 7C, the low frequency representation of the analog acceleration signal provided by low pass filter 158 is shown plotted versus time. The analog reference signal TH4 410, like analog reference signal TH1 402, is set at mid-supply, corresponding to a zero-g level. As with comparator/latch circuit 122, comparator/latch circuit 190 is on all the time, and provides a high level signal at output 198 of AND/OR circuit 132. Referring finally to FIG. 7D, the analog velocity signal 412 provided by analog signal integrating circuit 168 is shown plotted versus time. The analog reference signal TH3 is set at a mid-velocity level 414. Since the analog velocity signal 412 exceeds the analog reference signal TH3, comparator/latch circuit 178 provides a high level signal to input 184 of AND/OR circuit 132. If AND/OR circuit 132 is configured for an AND function, and since the signals at inputs 130, 154, 184, and 198 are all high level, AND/OR circuit 132 provides a high level deploy out signal at output 206 thereof, corresponding to an air bag deployment event.

From the foregoing examples, it should now be appreciated that any single analog signal processing circuit 120, 136, 166, or 188, or any combination thereof, may be used to evaluate the analog acceleration signal provided by low pass filter 114 in generating an air bag deployment signal. In the preceding examples, analog signal processing circuits 120 and 188 were effectively disabled by configuring AND/OR circuit 132 to provide the AND function, and by ensuring that comparator/latch circuits 122 and 190 were on all the time. Thus, in the above examples, only the analog velocity signals were evaluated in determining whether a deployment event should occur.

Figure 8:
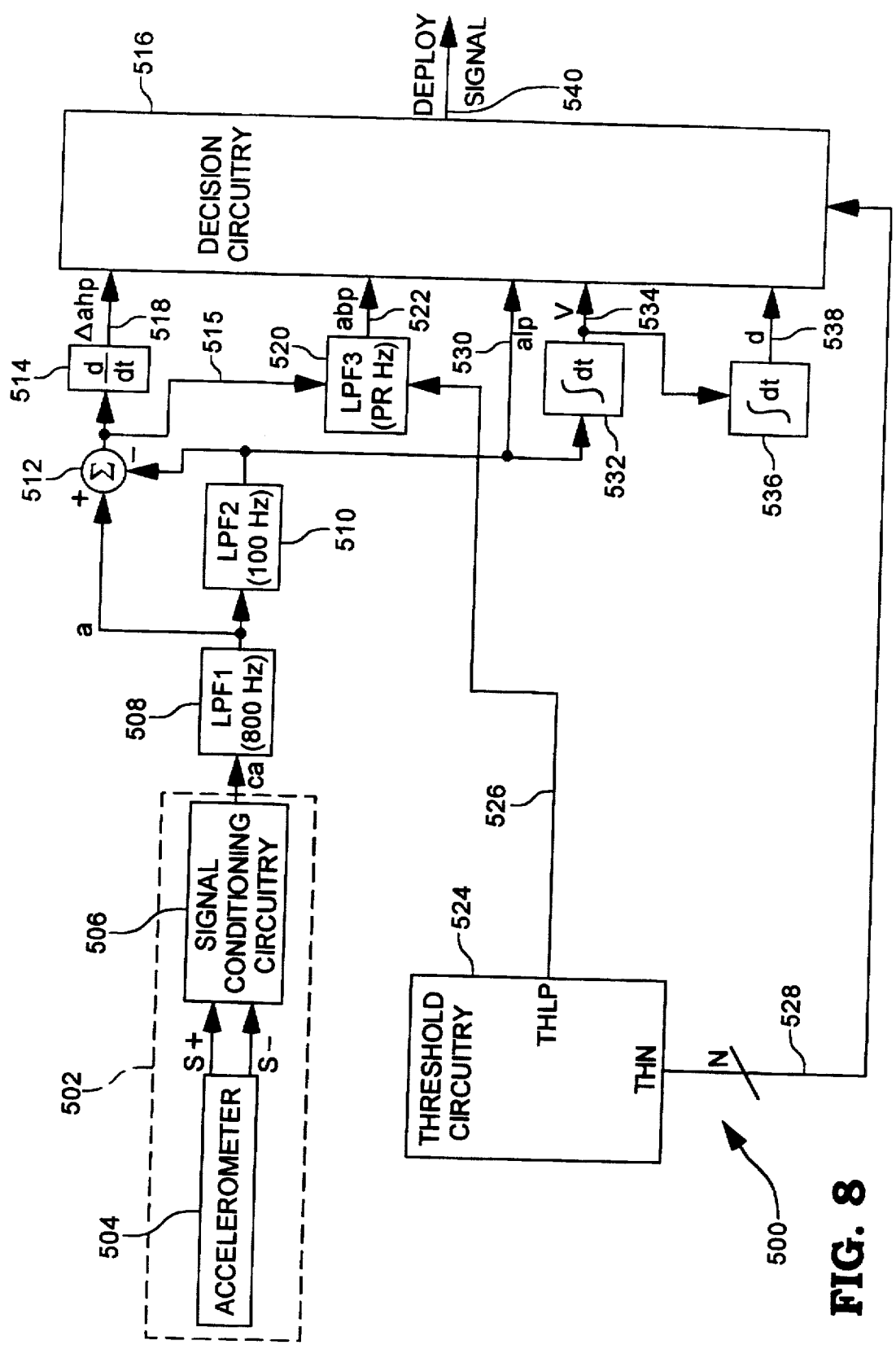
FIG. 8 is a diagrammatic illustration of another embodiment of an analog signal processing system for determining supplemental inflatable restraint deployment, in accordance with the present invention.

Referring now to FIG. 8, another embodiment of an analog signal processing system 500 for determining supplemental inflatable restraint deployment, in accordance with the present invention, is shown. System 500 includes an acceleration sensing circuit 502 operable to sense vehicle acceleration/deceleration and provide a conditioned acceleration signal (ca) corresponding thereto. In one preferred embodiment, acceleration sensing circuit 502 includes an accelerometer 504 identical to that described with respect to accelerometer 102 of FIG. 3, and a signal conditioning circuit 506 identical to that described with respect to circuitry 104 of FIG. 3. In such a configuration, accelerometer 504 is responsive to vehicle acceleration/deceleration to produce a differential acceleration signal (S+, S−), and signal conditioning circuit 506 is responsive to the differential acceleration signal S+, S− to provide for amplification, offset and temperature compensation thereof as described hereinabove. It is to be understood, however, that although acceleration sensing circuit 502 is shown in FIG. 8 as including accelerometer 504 and signal conditioning circuit 506, the present invention contemplates that acceleration sensing circuit 502 may be any known acceleration sensor operable to provide a suitable analog acceleration signal ca.

Analog acceleration signal ca is received by a first low pass filter 508 operable to remove undesired resonant frequency effects from the analog acceleration signal ca. Preferably, low pass filter 508 is identical to low pass filter 114 of FIG. 3, and is therefore a second-order 800 Hz switched capacitor low pass filter. As with filter 114, however, filter 508 may be any known low pass filter having a cut off frequency set at any frequency below the undesirable resonant frequency. In any event, low pass filter 508 receives analog acceleration signal ca and produces a low-pass analog acceleration signal a.

Low pass analog acceleration signal a is received by a second low pass filter 510, which is preferably designed to have a cut off frequency lower than that of low pass filter 508. In one preferred embodiment, low pass filter 510 is identical to low pass filter 158 of FIG. 3, and is therefore a first-order 100 Hz switched capacitor low pass filter. As with filter 158, however, filter 510 may be any known low pass filter having a cut off frequency set to some frequency less than the cut off frequency of low pass filter 508. In any event, low pass filter 510 receives analog acceleration signal a and provides a low-pass analog acceleration signal alp to decision circuitry 516 via signal path 530.

Analog output signals a and alp of low pass filters 508 and 510 respectively are received by a subtraction circuit 512 of known construction, wherein subtraction circuit 512 acts as a band pass filter by providing an analog acceleration signal on signal path 515 having frequency components between the cut off frequencies of low pass filters 508 and 510. In a preferred embodiment wherein the cut off frequency of low pass filter 508 is 800 Hz and the cut off frequency of low pass filter 510 is 100 Hz, subtraction circuit 512 thus provides an analog acceleration signal having frequency components between 100–800 Hz.

The band pass analog acceleration signal on signal path 515 is received by a differentiation circuit 514 of known construction, which differentiates the band pass analog acceleration signal over time and provides the differentiated band pass analog acceleration signal Dahp to decision circuitry 516 via signal path 518. The band pass analog acceleration signal on signal path 515 is also received by a third low pass filter 520. Preferably, low pass filter 520 is a first-order switched capacitor low pass filter, although the present invention contemplates that filter 520 may be any low pass filter of known construction. In any case, low pass filter 520 preferably has a selectable cut off frequency between that of low pass filter 508 and low pass filter 510. Low pass filter 520 thus acts as a band pass filter by passing a smaller band of frequencies than that of subtraction circuit 512. The band pass analog acceleration signal abp produced by low pass filter 520 is provided to decision circuitry 516 via signal path 522.

System 500 further includes analog threshold circuitry 524 of known construction, which is operable to provide a number of analog threshold signals. Analog threshold circuitry 524 is operable to produce N such analog threshold signals, wherein N may be any integer, on signal path 528. Thus purpose of such analog threshold signals will be discussed more fully hereinafter. Another such analog threshold signal THLP produced by circuitry 524 is provided to low pass filter 522 via signal path 526. The cut off frequency of low pass filter 520 is a function of the signal level of analog threshold signal THLP, and is preferably responsive to discrete levels thereof to produce any of a number of desired cut off frequencies. In one preferred embodiment, low pass filter is responsive to four distinct ranges of analog threshold signal THLP to provide for four corresponding cut off frequencies of 300 Hz, 400 Hz, 500 Hz and 600 Hz. With low pass filter 508 having a cut off frequency of 800 Hz and low pass filter 510 having a cut off frequency of 100 Hz, low pass filter may thus be programmed, via appropriate choice of THLP, to produce a band pass analog acceleration signal abp of between 300–800 Hz, 400–800 Hz, 500–800 Hz or 600–800 Hz. Those skilled in the art will, however, appreciate that the cut off frequency of low pass filter 520 may be designed, as is known in the art, to have any cut off frequency between those of low pass filters 508 and 510, and may further be any function of the analog threshold sign THLP.

Analog acceleration signal alp is further received by a first known analog integration circuit 532 operable to integrate the analog signal alp with respect to time and provide a corresponding analog velocity signal v to decision circuitry 516 via signal path 534. The analog velocity signal v is further received by a second known analog integration circuit 536 operable to integrate the analog velocity signal with respect to time and provide a displacement signal d to decision circuitry 516 via signal path 538. Decision circuitry 516 is operable, as will be discussed in greater detail hereinafter, to receive the analog signals Dahp, abp, alp, v and d and provide an airbag deployment signal therefrom on signal path 540.

In the operation of system 500, the low pass analog acceleration signal alp is used to provide a measure of the impact force sensed by acceleration sensor circuitry 502, wherein it is recognized that the velocity accumulated from alp determines the structure movement. However, while the low frequency components contained in the analog acceleration signal alp are primarily used to discriminate between impact and non-impact events, it is recognized that the acceleration sensor circuit 502 may miss the low frequency part of the analog acceleration signal a due to the lack of penetration which results from a small contact area between the impact force and the vehicle structure when the acceleration sensor 504 is positioned remote from the impact zone. In this situation, referred to hereinafter as localized impact discrimination, system 500 relies, in part, on the mid-frequency band analog signal abp to discriminate between deploy and non-deploy events.

It is further recognized that the severity of an impact is directly proportional to the rate at which the impact force is transferred to the vehicle structure, i.e. the force loading rate. In general, the more severe an impact, the higher the force loading rate. The analog signal Dahp is used by system 500 to provide a measure of the force loading rate. The analog velocity signal v is used by system 500 to provide a measure how fast the structure is moving at the sensing location, i.e. the impact energy, and the analog displacement signal d is used to provide a measure of how much the structure has moved as a result of the impact. The processing of the foregoing analog signals by decision circuitry 516 will be described in greater detail hereinafter.

Referring now to FIG. 9, one preferred embodiment of the decision circuitry 516 of FIG. 8, in accordance with another aspect of the present invention, is shown. Decision circuitry 516 includes an interface circuit 542 operable to receive the analog signals Dahp, abp, alp, v and d, and convert such analog signals to logic level signals for use by decision logic circuit 544. The deploy signal output 540 of decision logic circuit 544 is provided to a suitable driver circuit for actuating an airbag deployment system as is known in the art.

Interface circuit 542 includes a number of latch circuits (L1–L5), which may be of known construction, as well as a number of comparator circuits (C1–C5), which may also be of known construction, wherein such latch and comparator circuits are operable to receive the analog signals discussed in the preceding paragraph, compare each such analog signal to one of a number of threshold signal levels, and provide logical signal representations of the analog signals as one of two possible logic states. A first latch circuit 546 receives analog signal Dahp at a first input thereof via signal path 518, an analog threshold signal ahp1 at a threshold input thereof via signal path 528a (one of the N signal paths comprising signal path 528 of FIG. 8), and provides a logic signal AHP at an output thereof via signal path 566. If the analog signal Dahp is greater than the analog threshold signal ahp1, then latch 546 preferably switches logic signal AHP to a high logic state, and if Dahp is less than ahp1, latch 548 preferably switches AHP to an opposite low logic state.

A second latch circuit 548 receives analog signal abp at a first input thereof via signal path 522, an analog threshold signal abp1 at a threshold input thereof via signal path 528b (another one of the N signal paths comprising signal path 528 of FIG. 8), and provides a logic signal ABP at an output thereof via signal path 568. If the analog signal abp is greater than the analog threshold signal abp1, then latch 548 preferably switches logic signal ABP to a high logic state, and if abp is less than abp1, latch 548 preferably switches ABP to an opposite low logic state.

A third latch circuit 550 receives analog signal alp at a first input thereof via signal path 530, an analog threshold signal alp1 at a threshold input thereof via signal path 528c (another one of the N signal paths comprising signal path 528 of FIG. 8), and provides a logic signal ALP at an output thereof via signal path 570. If the analog signal alp is greater than the analog threshold signal alp1, then latch 550 preferably switches logic signal ALP to a high logic state, and if alp is less than alp1, latch 550 preferably switches ALP to an opposite low logic state.

A fourth latch circuit 552 receives analog signal v at a first input thereof via signal path 534, an analog threshold signal v1 at a threshold input thereof via signal path 528d (another one of the N signal paths comprising signal path 528 of FIG. 8), and provides a logic signal VA at an output thereof via signal path 572. If the analog signal v is greater than the analog threshold signal v1, then latch 552 preferably switches logic signal VA to a high logic state, and if v is less than v1, latch 552 preferably switches VA to an opposite low logic state.

A fifth latch circuit 558 receives analog signal v at a first input thereof via signal path 534, an analog threshold signal v4 at a threshold input thereof via signal path 528g (another one of the N signal paths comprising signal path 528 of FIG. 8), and provides a logic signal VD at an output thereof via signal path 578. If the analog signal v is greater than the analog threshold signal v4, then latch 558 preferably switches logic signal VD to a high logic state, and if v is less than v4, latch 558 preferably switches VD to an opposite low logic state. While latches L1–L5 preferably operate in the foregoing manner, those skilled in the art will recognize that latches L1–L5 may alternatively be configured to provide logic signal outputs having logic states that are the inverse of that just described.

A first comparator circuit 554 receives analog signal v at a first input thereof via signal path 534, an analog threshold signal v2 at a threshold input thereof via signal path 528e (another one of the N signal paths comprising signal path 528 of FIG. 8), and provides a logic signal VB at an output thereof via signal path 574. If the analog signal v is greater than the analog threshold signal v2, then comparator 554 preferably switches logic signal VB to a high logic state, and if v is less than v2, comparator 554 preferably switches VB to an opposite low logic state.

A second comparator circuit 556 receives analog signal v at a first input thereof via signal path 534, an analog threshold signal v3 at a threshold input thereof via signal path 528f (another one of the N signal paths comprising signal path 528 of FIG. 8), and provides a logic signal VC at an output thereof via signal path 576. If the analog signal v is greater than the analog threshold signal v3, then comparator 556 preferably switches logic signal VC to a high logic state, and if v is less than v2, comparator 556 preferably switches VC to an opposite low logic state.

A third comparator circuit 560 receives analog signal d at a first input thereof via signal path 538, an analog threshold signal d1 at a threshold input thereof via signal path 528h (another one of the N signal paths comprising signal path 528 of FIG. 8), and provides a logic signal DA at an output thereof via signal path 580. If the analog signal d is greater than the analog threshold signal d1, then comparator 560 preferably switches logic signal DA to a high logic state, and if d is less than d1, comparator 560 preferably switches DA to an opposite low logic state.

A fourth comparator circuit 562 receives analog signal d at a first input thereof via signal path 538, an analog threshold signal d2 at a threshold input thereof via signal path 528i (another one of the N signal paths comprising signal path 528 of FIG. 8), and provides a logic signal DB at an output thereof via signal path 582. If the analog signal d is greater than the analog threshold signal d2, then comparator 562 preferably switches logic signal DB to a high logic state, and if d is less than d2, comparator 562 preferably switches DB to an opposite low logic state.

A fifth comparator circuit 564 receives analog signal d at a first input thereof via signal path 538, an analog threshold signal d3 at a threshold input thereof via signal path 528j (another one of the N signal paths comprising signal path 528 of FIG. 8), and provides a logic signal DC at an output thereof via signal path 584. If the analog signal d is greater than the analog threshold signal d3, then comparator 564 preferably switches logic signal DC to a high logic state, and if d is less than d3, comparator 564 preferably switches DC to an opposite low logic state. While comparators C1–C5 preferably operate in the foregoing manner, those skilled in the art will recognize that comparators C1–C5 may alternatively be configured to provide logic signal outputs having logic states that are the inverse of that just described.

Decision logic circuit 544, in one preferred embodiment, includes localized impact discrimination (LID) circuitry 586 and impact dynamics discrimination circuitry (IDD) 592. LID circuitry 586 receives logic signal AHP at a first input thereof via signal path 566, logic signal ABP at a second input thereof via signal path 568, and provides a corresponding logic level output signal on signal path 588. Signal path 588 is connected to a first input of a two-input OR gate 590, wherein the output of the OR gate 590 is connected to deploy out signal path S40. Further details of LID circuitry 586 will be discussed hereinafter.

IDD circuitry 592 includes a number of subcircuits operable to process the logic level acceleration, velocity and displacement signals. In one preferred embodiment, IDD circuitry 592 includes an impact detection (ID) circuit 596 receiving logic signal AHP at a first input thereof via signal path 566, logic signal ALP at a second input thereof via signal path 570 and logic signal VA at a third input thereof via signal path 572, and provides a corresponding logic level output on signal path 598. IDD circuitry 592 further includes an impact severity testing (IST) circuit 600 receiving logic signal VA at a first input thereof via signal path 572, logic signal ALP at a second input thereof via signal path 570, logic signal VB at a third input thereof via signal path 574, logic signal VC at a fourth input thereof via signal path 576, logic signal DA at a fifth input thereof via signal path 580, logic signal DB at a sixth input thereof via signal path 582 and logic signal DC at a seventh input thereof via signal path 584, and provides a corresponding logic level output signal on signal path 602. IDD circuitry 592 further includes a negative velocity disable logic (NVDL) circuit 604 receiving logic signal VD at an input thereof, and providing a corresponding logic level output signal on signal path 606. Finally, IDD circuitry 592 preferably includes a three-input AND gate 608 having a first non-inverting input connected to signal path 598, a second non-inverting input connected to signal path 602, a third inverting input connected to signal path 606, and an output connected to the remaining input of OR gate 590 via signal path 594. Further details of ID circuit 596, IST circuit 600 and NVDL circuit 604 will be discussed hereinafter.

Figure 10A:
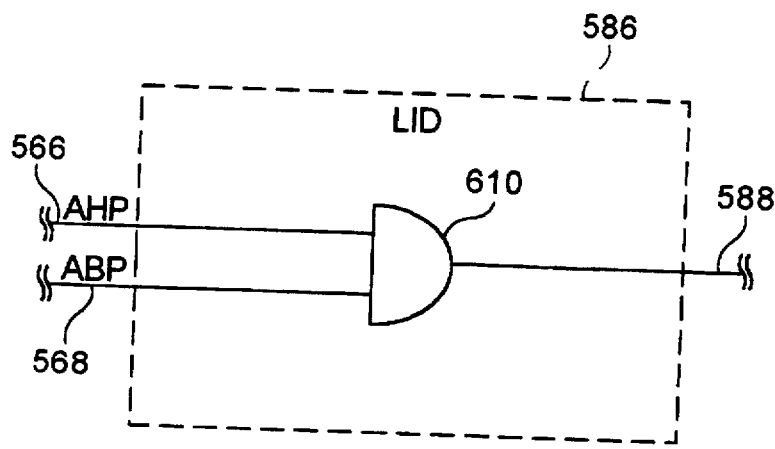
FIG. 10A is a diagrammatic illustration of one embodiment of the localized impact discriminator circuit (LID) of FIG. 9, in accordance with the present invention.

Referring now to FIG. 10A, one preferred embodiment of the LID circuitry 586, in accordance with the present invention, is shown. LID circuitry 586 preferably includes a two-input AND gate 610 having a first input receiving logic signal AHP via signal path 566, a second input receiving logic signal ABP and an output providing a corresponding logic level output signal via signal path 588. In accordance with AND rules, the output signal on signal path 588 will have a high logic state only of the two input signals AHP and ABP have high logic states.

Figure 10B:
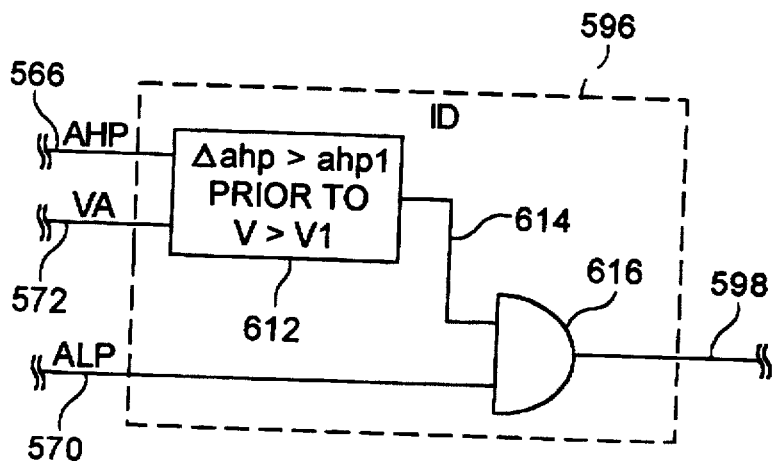
FIG. 10B is a diagrammatic illustration of one embodiment of the impact detector circuit (ID) of FIG. 9, in accordance with the present invention.

Referring now to FIG. 10B, one preferred embodiment of the ID circuit 596, in accordance with the present invention, is shown. ID circuit 596 preferably includes a logic circuit 612 having a first input receiving logic signal AHP via signal path 566, a second input receiving logic signal VA via signal path 572 and an output providing a corresponding logic level output signal on signal path 614. Logic circuit 612, which may be of known construction, preferably provides a logic level output signal having a high logic state on signal path 614 when the logic signals AHP and VA indicate that analog signal Dahp is greater than analog threshold signal ahp1 prior to analog signal v being greater than analog threshold signal v1, although the present invention contemplates that circuit 612 may be configured to provide for inverse logical operation. In any case, ID circuit 596 further includes an AND gate 616 having a first input connected to signal path 614, a second input receiving logic signal ALP via signal path 570, and an output providing a corresponding logic level output signal on signal path 598.

Figure 10C:
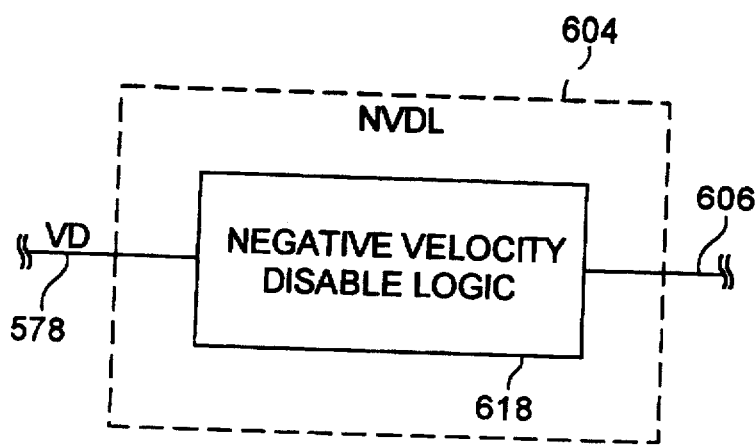
FIG. 10C is a diagrammatic illustration of one embodiment of the negative velocity disable logic circuit (NVDL) of FIG. 9, in accordance with the present invention.
Figure 10D:
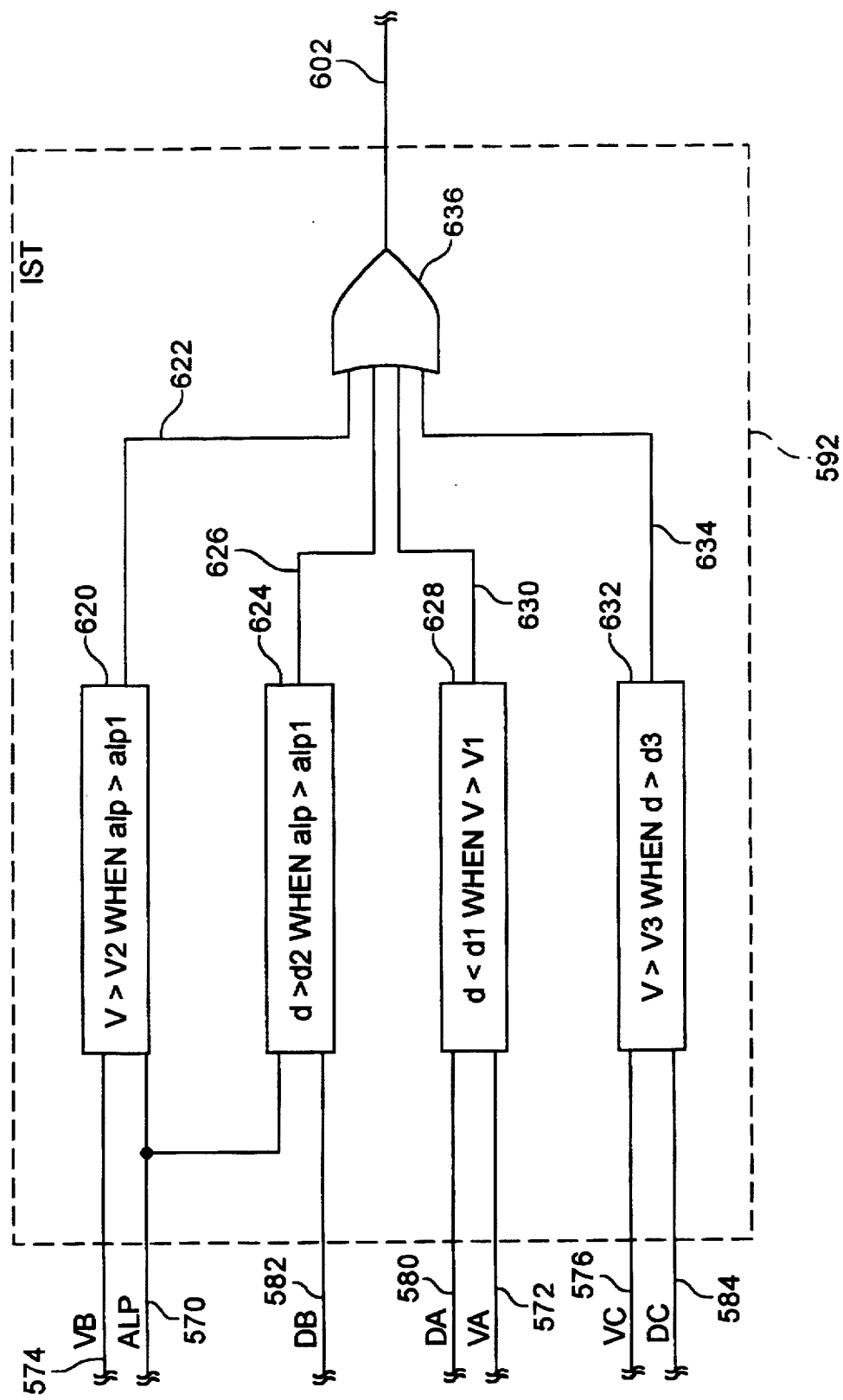
FIG. 10D is a diagrammatic illustration of one embodiment of the impact severity tester circuit (IST) of FIG. 9, in accordance with the present invention.

Referring now to FIG. 10C, one preferred embodiment the NVDL circuit 604, in accordance with the present invention, is shown. NVDL circuit 604 preferably includes a logic circuit 618, which may be of known construction, having an input receiving logic signal VD via signal path 578 and an output providing a corresponding logic level output signal on signal path 606. Preferably, the NVDL logic circuit 618 is operable to provide an output signal on signal path 606 having a high logic state if the analog signal v is less than the analog threshold signal v4, thereby indicating a "negative" velocity condition, and otherwise having a low logic state, although NVDL circuit 618 may be configured for inverse logic operation. The term "negative", as it relates to circuit 618, will be defined hereinafter.

Referring now to FIG. 1D, one preferred embodiment of the IST circuit 592, in accordance with the present invention, is shown. IST circuit 592 preferably includes a first logic circuit 620, which may be of known construction, receiving logic signal ALP at a first input thereof via signal path 570, a second input receiving logic signal VB via signal path 574 and an output providing a corresponding logic level output signal on signal path 620. Preferably, logic circuit 620 is operable to provide an output signal on signal path 622 having a high logic state if analog signal v is detected as greater than analog threshold signal v2 when analog signal alp is greater than analog threshold signal alp1, although logic circuit 620 may be configured for inverse logic operation.

IST circuit 592 further includes a second logic circuit 624, which may be of known construction, receiving logic signal ALP at a first input thereof via signal path 570, a second input receiving logic signal DB via signal path 582 and an output providing a corresponding logic level output signal on signal path 626. Preferably, logic circuit 624 is operable to provide an output signal on signal path 626 having a high logic state if analog signal d is detected as greater than analog threshold d2 when analog signal alp is greater than analog threshold signal alp1, although logic circuit 624 may be configured for inverse logic operation.

IST circuit 592 further includes a third logic circuit 628, which may be of known construction, receiving logic signal DA at a first input thereof via signal path 580, a second input receiving logic signal VA via signal path 572 and an output providing a corresponding logic level output signal on signal path 630. Preferably, logic circuit 628 is operable to provide an output signal on signal path 630 having a high logic state if analog signal d is detected as less than analog threshold signal d1 when analog signal v is greater than analog threshold signal v1, although logic circuit 628 may be configured for inverse logic operation.

IST circuit 592 further includes a fourth logic circuit 632, which may be of known construction, receiving logic signal VC at a first input thereof via signal path 576, a second input receiving logic signal DC via signal path 584 and an output providing a corresponding logic level output signal on signal path 634. Preferably, logic circuit 632 is operable to provide an output signal on signal path 634 having a high logic state if analog signal v is detected as greater than analog threshold signal v3 when analog signal d is greater than analog threshold signal d3, although logic circuit 628 may be configured for inverse logic operation.

Finally, IST circuit 592 preferably includes a four-input OR gate 636 having a first input connected to signal path 622, a second input connected to signal path 626, a third input connected to signal path 630, a fourth input connected to signal path 634 and an output providing a corresponding logic level output signal on signal path 602. In operation, as will be discussed in greater detail hereinafter, IST circuit 592 preferably provides an output signal on signal path 602 having a high logic state if any of the conditions indicated within logic circuits 620, 624, 628 or 632 are true, although IST circuit 592 may be configured for inverse logic operation.

Operation of the various components of the decision logic circuit 544, as such operation relates to the analog signals Dahp, abp, alp, v and d and their counterpart logic signals, will now be described in detail. In general, the deployment decision logic is partitioned into two separate deployment decision circuits; namely the localized impact discrimination (LID) circuit 586 and impact dynamics discrimination (IDD) circuit 592. If either of the these circuits identifies an airbag deployment event, the corresponding circuit preferably provides an output signal having a high logic state to a corresponding input of OR gate 590. In accordance with OR rules, if either or both of the circuits 586 and 592 produce an output signal having a high logic state, OR gate 590 produces a logic level deploy signal having a high logic state on signal path 540, thereby directing a known airbag deployment mechanism to deploy the airbag. Thus, either of the circuits 586 and 592 may separately and individually trigger an airbag deployment event, and the operation of each circuit will therefore be discussed separately.

Focussing first on the localized impact discrimination (LID) circuit 586, the present invention recognizes that in a localized impact, i.e. one having a relatively small impact contact area, penetration of the impact into the vehicle (i.e. transmission of the impact into the vehicle structure) must be carefully monitored. For example, if the acceleration sensor 504 is mounted in or very near the impact zone of the vehicle, it may capture and properly process a localized impact event in accordance with any of a variety of known techniques. On the other hand, if the sensor 504 is mounted remote from the impact zone, as is nearly always the case, the sensed acceleration signal may not be a true representation of the impact due to the penetration of the lower frequency impact energy into the vehicle, particularly if sensor 504 is not in the contact area of the force loading path of the impact. In such cases, however, higher frequency vibrations resulting from the localized impact have higher transmissibility through the vehicle structure, and are therefore typically detectable via sensor 504. While a localized impact event of sufficient severity to warrant an active airbag deployment signal produces higher frequency vibrations, so does an "abuse", which is defined as an impact of insufficient severity to warrant an active airbag deployment signal. However, the present invention recognizes that vibrations resulting from a severe localized impact have more energy in the mid frequencies than that of abuses.

In accordance with the foregoing principles, the localized impact discrimination circuit 586 is configured to process such mid-frequency analog acceleration signals (abp), as well as force loading rate information (Dahp), in controlling an airbag deployment event. Preferably, analog threshold signal ahp1 is set such that latch 546 latches output AHP high when a force loading rate (Dahp) above a desired force loading rate is detected. Likewise, analog threshold signal abh1 is set such that latch 548 latches output ABP high when the analog band-pass signal Dahp contains sufficient energy to warrant an airbag deployment event. The high logic states of AHP and ABP cause the AND gate 610 of LID circuit 586 to produce an output signal also having a logic high state. The logic high output of AND gate 610 passes through OR gate 590 of decision logic circuit 544, thereby forcing the deploy logic signal on signal path 540 to a logic high state. An Airbag deployment mechanism, such as one or more solenoid drivers (not shown), is responsive to the logic high state of the deploy logic signal on signal path 540 to deploy one or more airbags (not shown).

Focussing now on the impact dynamics discrimination (IDD) circuit 592, a severe impact deserving of an airbag deployment is characterized by a strong impact force (alp in excess of alp1), high impact energy (v in excess of v1) and a fast force loading rate (Dahp in excess of ahp1), wherein the present invention recognizes that a key component of accurate impact detection is the force loading rate. In an impact condition, the force loading rate is typically fast, while a slow force loading rate is indicative of a vehicle push. Moreover, in an impact event, the force loading rate should be fast at the beginning of the event, and the detected impact energy should be the result of the fast force loading rate, i.e. the impact force alp) should cause the impact energy (v). While a strong impact force having high impact energy and a fast force loading rate is indicative of a strong impact, the present invention further relies on the status of related signal parameters before activating an airbag deployment event; namely the direction of the impact and a quantitative analysis of the severity of the impact.

In accordance with the foregoing principles, the impact discrimination (ID) circuit 596 is configured to process the status of the force loading rate signal ALP, the impact force signal ALP and the impact energy signal VA in determining whether an strong impact has occurred. As discussed above, analog threshold signal ahp1 is set such that latch 546 latches output AHP high when a force loading rate (Dahp) above a desired force loading rate is detected (i.e. above that which may otherwise be considered a vehicle push). Likewise, analog threshold signal alp1 is set such that latch 550 latches output ALP high when an impact force above a strong impact force threshold, and analog threshold signal v1 is set such that latch 552 latches output VA high when an impact energy above a high impact energy. Logic circuit 612 of ID circuit 596 is responsive to AHP and VA to produce a high logic state output signal on signal path 614 only if AHP was detected as having a high logic state prior to detection of a high VA logic state. AND gate 616 is responsive to the high logic state of the circuit 612 output signal on signal path 614 and the high logic state of ALP to produce a high logic state output signal on signal path 598. Any other signal combination at the inputs of AND gate 616 produces a low logic state output signal on signal path 598. Thus, impact discrimination circuit 596 produces an airbag deployment signal on signal path 598 if a strong impact force is detected, a high impact energy is detected, a fast force loading rate is detected, and the fast force loading rate was detected prior to detecting the high impact energy.

The negative velocity disable logic (NVDL) circuit 618 is configured to disable an airbag deployment signal generated by ID circuit 596 and IST circuit 600 on signal paths 598 and 602 respectively if the impact is detected as being generated from an improper direction. A "positive" velocity is defined as being directed at the front end of the vehicle or as being directed from an outside of the vehicle toward the inside of the vehicle, while a "negative" velocity is conversely defined as being directed at the rear end of the vehicle or as being directed from an inside of the vehicle toward the outside. Preferably, analog threshold signal v4 is set to a negative signal level (corresponding to a negative velocity) and, if the analog signal v is less than v4, latch 558 latches VD to a low logic state. NVDL circuit preferably inverts the VD signal and thus provides a high level logic signal on signal path 606. Signal path 606 is connected to the inverting input of AND gate 608 so that the high level logic signal on signal path 606 "disables" AND gate 608 by forcing the output signal on signal path 606 to a low logic state.

The impact severity tester (IST) circuit 592 is preferably configured to test three basic impact parameters; namely the instantaneous velocity change of the sensor 504 (alp), how fast the sensor 504 is moving (v), and how far the sensor 504 has been displaced (d). The IST circuit 592 establishes relative relationships among the three foregoing impact parameters in order to determine whether the impact detected by ID circuit 596 is severe enough to warrant an airbag deployment event.

A first logic circuit 620 receives signals VB and ALP and produces an output signal having a high logic state on signal path 622 if the analog velocity signal v is greater than the analog threshold signal v2 when the analog acceleration signal alp is greater than the analog threshold signal alp1, thereby indicating that the sensor 504 has at least a predefined speed when it reaches some predefined acceleration level in a severe impact condition. Thus, if the analog acceleration signal alp is greater than an analog threshold signal alp1, latch 550 latches ALP high. Likewise, if the analog velocity signal v is greater than an analog threshold signal v2, the output VB of comparator 554 is forced high. If ALP is at a logic high state when VB switches to a logic high state, the output signal on signal path 622 similarly switches to a high logic state. For any other signal conditions, the output signal on signal path 622 is at a logic low state.

A second logic circuit 624 receives signals DB and ALP and produces an output signal having a high logic state on signal path 626 if the analog displacement signal d is greater than the analog threshold signal d2 when the analog acceleration signal alp is greater than the analog threshold signal alp1, thereby indicating that the sensor 504 has moved at least a predefined distance when it reaches some predefined acceleration level in a severe impact condition. Thus, if the analog acceleration signal alp is greater than an analog threshold signal alp1, latch 550 latches ALP high. Likewise, if the analog displacement signal d is greater than an analog threshold signal d2, the output DB of comparator 562 is forced high. If ALP is at a logic high state when DB switches to a logic high state, the output signal on signal path 626 similarly switches to a high logic state. For any other signal conditions, the output signal on signal path 626 is at a logic low state.

Figure 11:
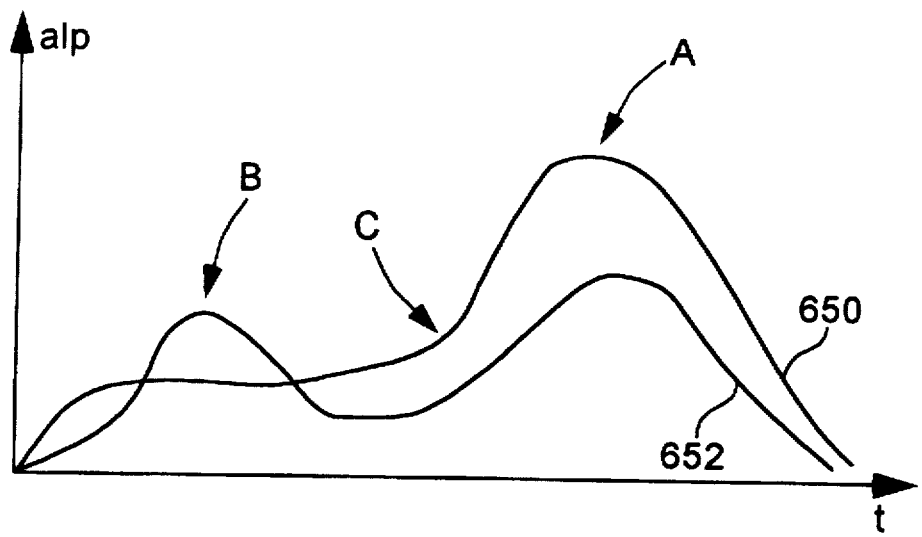
FIG. 11 is a plot of impact force over time for a severe localized impact event and a non-severe full impact event.

The first and second logic circuits 620 and 624 are included to allow decision logic circuit 544 to discriminate between a severe localized impact (one in which the airbag should be deployed) and a non-severe full impact (one in which the airbag should not be deployed). Penetration of an impact into the vehicle structure is a function of the impact location and the contact area between the impact force and the vehicle structure and, in general, the more localized the impact the greater the penetration (transmission) of the impact into the vehicle. When the sensor 504 is located remote from the impact zone, the high penetration of a localized impact makes such an impact difficult to sense. Referring to FIG. 11, acceleration waveforms (alp) vs time are shown for the two impact scenarios just discussed; namely a severe localized impact 650 and a non-severe full impact 652.

Inspection of FIG. 11 reveals than while the severe localized impact 650 may eventually exhibit a higher impact force than the non-severe full impact (see peak A), the impact force of the non-severe full impact 652 may exceed that of the severe localized impact 650 early in the impact event. This is because the severe localized impact 650 has very high penetration into the vehicle, thereby requiring some time before the remotely positioned sensor 504 is able to accurately sense the impact force. By contrast, the impact force of a non-severe full impact 652 is applied to a much larger contact area of the vehicle which allows more of the vehicle structure to resist the impact. The vehicle structure thus "fights back" early in the impact event until the impact force is sufficient to overcome the resistance of the vehicle structure. This fighting back of the vehicle structure results in a short-lived peak B early in the non-severe full impact waveform 652 that exceeds the signal level of the severe localized impact waveform 650. In many cases, an ideal threshold level of alp1 is at the point (transition point C) of the severe localized impact waveform 650 that rises toward peak A. If, however, alp1 is set at this level in order to optimize detection of a severe localized impact, peak B of the non-severe full impact waveform 652 would cause ID circuit 596 to recognize a severe impact when, in fact, a non-severe impact occurred.

Logic circuits 620 address the foregoing problem by recognizing that in a severe localized impact 650, the velocity accumulated up to the time at which alp crosses alp1 (transition C) would be larger than that in a non-severe full impact 652. Thus, logic circuit 620 requires v to exceed threshold v2 when alp is greater than alp1, wherein v2 is chosen to provide for airbag deployment pursuant to waveform 650 but not pursuant to waveform 652.

Logic circuit 624 is provided as a back up circuit to circuit 620 to thereby allow for some variation in the velocity signal as compared to threshold v2. In practice, impact signals vary due to variations in vehicle structure so that two vehicles involved in identical impacts may respond differently over some local time period. The threshold signal d2 may thus be chosen to fit specific vehicle structures so that the displacement signal d may be used as described with respect to circuit 624 to minimize the effects of any velocity variations.

A third logic circuit 628 receives signals VA and DA and produces an output signal having a high logic state on signal path 630 if the analog velocity signal v is greater than the analog threshold signal v1 when the analog displacement signal d is less than the analog threshold signal d1, thereby indicating that the sensor 504 moves less distance to reach a particular velocity in a severe impact event. Thus, if the analog displacement signal d is less than an analog threshold signal d1, the output DA of comparator 560 is forced high. Likewise, if the analog velocity signal v is greater than an analog threshold signal v1, latch 552 latches VA high. If VA is at a logic high state when DA switches to a logic high state, the output signal on signal path 630 similarly switches to a high logic state. For any other signal conditions, the output signal on signal path 630 is at a logic low state.

A fourth logic circuit 632 receives signals VC and DC and produces an output signal having a high logic state on signal path 634 if the analog velocity signal v is greater than the analog threshold signal v3 when the analog displacement signal d is greater than the analog threshold signal d3, thereby indicating that the sensor 504 gains higher speed as it moves a certain distance in a severe impact event. Thus, if the analog velocity signal v is greater than an analog threshold signal v3, the output VC of comparator 556 is forced high. Likewise, if the analog displacement signal d is greater than an analog threshold signal d3, the output DC of comparator 564 is forced high. If DC is at a logic high state when VC switches to a logic high state, the output signal on signal path 634 similarly switches to a high logic state. For any other signal conditions, the output signal on signal path 634 is at a logic low state.

Figure 12:
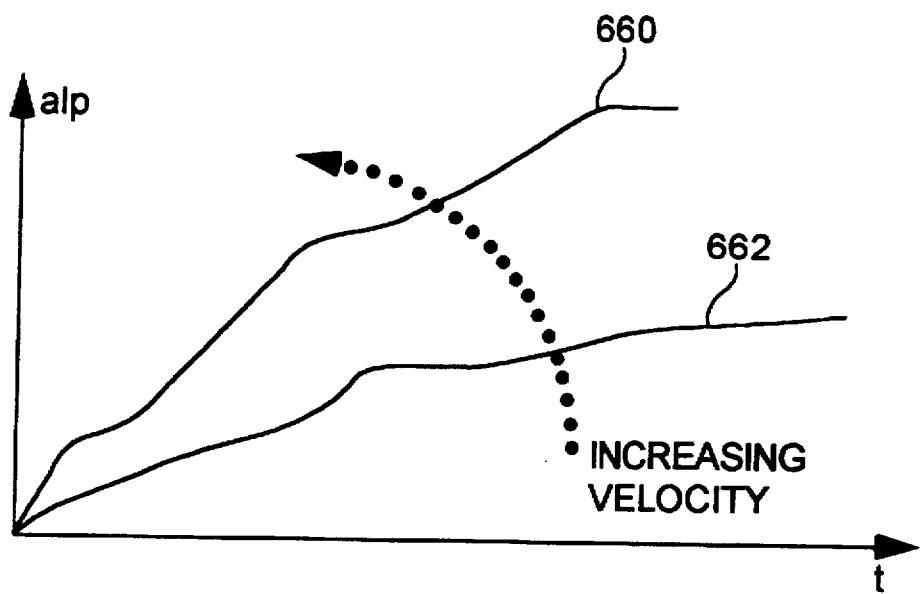
FIG. 12 is a plot of impact force over time for two identical impacts each occurring at different vehicle speeds, wherein one impact waveform represents a severe (deployment event) impact and the other represents a non-severe (non-deployment event) impact.

The third and fourth logic circuits 628 and 632 are included to allow decision logic circuit 544 to discriminate between impact events of the same type, but occurring at different speeds. Referring to FIG. 12, acceleration waveforms (alp) vs time are shown for two such identical impact events each occurring at a different vehicle speed, wherein the higher speed impact 660 is sufficiently severe to require airbag deployment (a deployment impact) whereas the lower speed impact 662 is not sufficiently severe so as to require airbag deployment (a non-deployment impact).

Inspection of FIG. 12 reveals that the threshold signal alp1 must be located sufficiently above the non-deployment impact waveform 662 so as not to trigger airbag deployment. However, for timely discrimination of an impact event, it is undesirable to set the alp1 threshold too high. Circuit 628 solves this dilemma by recognizing that for a severe (deployment event) impact such as that illustrated by waveform 662, the sensor 504 moves less distance to reach a particular velocity level. Thus, alp1 may be set at some low value so that it intersects waveform 660, and circuit 628 will not produce an airbag deployment signal unless the sensor 504 has been displaced less than a predefined distance at a predefined level of velocity. Preferably, threshold signals v1 and d3 are chosen so that waveform 662 triggers airbag deployment while waveform 660 does not.

Circuit 630 provides a back up to circuit 628 by recognizing the corollary to circuit 628 in that sensor 504 will gain a higher velocity over the a predefined distance in a severe (deployment event) impact that in a non-severe (non-deployment event) impact over the same distance. Thus, threshold signals v3 and d3 are chosen so that waveform 662 triggers airbag deployment which waveform 660 does not.

It should be understood from the foregoing description of the impact dynamics discrimination circuitry 592 that the impact detection (ID) circuit 596 is operable to provide an output signal having a high logic state on signal path 598 as long as an impact of sufficient force, energy and fast force loading rate is detected, and as long as the fast force loading rate is detected prior to the high impact energy. Otherwise, ID circuit 596 produces an output signal having a low logic state on signal path 598. Further, if any single one or combination of the logic circuits 620, 624, 628 or 632 of impact severity testing circuit 592 produces an output signal having a logic high state, as discussed hereinabove, OR gate 636 passes a logic high signal to signal path 602. Conversely, if none of the logic circuits 620, 624, 628 or 632 produces an output signal having a high logic state, OR gate 636 passes a logic low signal to signal path 602. Finally, as long as a "positive velocity" is detected, wherein the term "positive velocity" is defined hereinabove, NVDL circuit 604 provides an output signal having a logic low state on signal path 606. If NVDL circuit 604 detects a "negative velocity", as this term is defined hereinabove, NVDL circuit 604 provides an output signal having logic high state on signal path 606. AND gate 608 is responsive to the high logic states of the signals on signal paths 598 and 602, and to the low logic state on signal path 606, to provide a deploy signal having a logic high state on signal path 594, thereby indicating an airbag deployment event. Any other signal combination on signal paths 598, 602 and 606 results in a deploy signal on signal path 540 having a low logic state, thereby indicating an airbag non-deployment event.

It should now be apparent that the present invention provides for control of airbag deployment by either one or both of the LID 586 and IDD circuits. Those skilled in the art will recognize that much, if not all, of the system 500 circuitry may be provided on a single integrated circuit fabricated in accordance with a process capable of combining analog and logic level circuits on a single circuit such as, for example a known BiCMOS or bipolar I²L process.

While the invention has been illustrated and described in detail in the foregoing drawings and description, the same is not to be considered as restrictive in character, it being understood that only the preferred embodiments have been shown and described and that all changes and modifications that come within the spirit of the invention are desired to be protected.

The embodiments of the invention in which an exclusive property or privilege is claimed are defined as follows:

1. Circuitry for generating an airbag deployment signal from an analog acceleration signal comprising:
    a first filter circuit receiving an analog acceleration signal and providing a first filtered analog signal as a first predefined frequency band thereof;
    a differentiation circuit receiving said first filtered analog signal and providing a differentiated analog signal therefrom;
    a second filter circuit receiving said first filtered analog signal and providing a second filtered analog signal as a second predefined frequency band thereof; and
    a decision circuit receiving said differentiated analog signal and said second filtered analog signal, and providing an airbag deployment signal therefrom.

2. The circuitry of claim 1 wherein said first filter circuit includes:
    a first low pass filter receiving said analog acceleration signal and providing only frequency components thereof less than a first predefined frequency as a first analog low pass filter signal;
    a second low pass filter receiving said first analog low pass filter signal and providing only frequency components thereof less than a second predefined frequency as a second analog low pass filter signal, wherein said second predefined frequency is less than said first predefined frequency; and
    a subtraction circuit receiving said first and second analog low pass filter signals and providing said first filtered analog signal as a difference thereof.

3. The circuitry of claim 1 wherein said second filter circuit includes a low pass filter receiving said first filtered analog signal and providing only frequency components thereof less than an upper frequency limit as said second filtered analog signal.

4. The circuitry of claim 3 wherein said second filter circuit includes means for selecting said upper frequency limit.

5. The circuitry of claim 4 wherein said means for selecting said upper frequency limit of said second predefined frequency band includes threshold circuitry providing an analog low pass filter threshold signal; and wherein said low pass filter is responsive to said analog low pass filter threshold signal to provide said upper frequency limit as a function thereof.

6. The circuitry of claim 1 wherein said decision circuit includes:
    an analog interface circuit receiving said differentiated analog signal, said second filtered analog signal, a first analog threshold signal and a second analog threshold signal, said interface circuit providing said differentiated analog signal as a first logic state if said differentiated analog signal is greater than said first threshold and otherwise providing said differentiated analog signal as a second opposite logic state, said interface circuit providing said second filtered analog signal as a first logic state if said second filtered analog signal is greater than said second analog threshold signal and otherwise providing said second filtered analog signal as a second opposite logic state; and
    localized impact discrimination circuitry responsive to logic states of said differentiated analog signal and said second filtered analog signal to provide said airbag deployment signal.

7. The circuitry of claim 6 further including threshold circuitry providing said first and second analog threshold signals as programmable analog signal levels.

8. The circuitry of claim 6 wherein said localized impact discrimination circuitry includes an AND gate having a first input receiving said logic state of said differentiated analog signal and a second input receiving said logic state of said second filtered analog signal, and an output providing said airbag deployment signal in accordance therewith.

9. The circuitry of claim 1 further including an accelerometer circuit providing said analog acceleration signal.

10. Circuitry for generating an airbag deployment signal from an analog acceleration signal comprising:
    a filter circuit receiving an analog acceleration signal and providing a first filtered analog signal as a first predefined frequency band thereof, and a second filtered analog signal as a second predefined frequency band thereof;
    a differentiation circuit receiving said first filtered analog signal and providing a differentiated analog signal therefrom;
    a first integration circuit receiving said second filtered analog signal and providing a first integrated analog signal therefrom; and
    a decision circuit receiving said differentiated analog signal, said second filtered analog signal and said first integrated analog signal, and providing an airbag deployment signal therefrom.

11. The circuitry of claim 10 wherein said filter circuit includes:
    a first low pass filter receiving said analog acceleration signal and providing only frequency components thereof less than a first predefined frequency as a first analog low pass filter signal;
    a second low pass filter receiving said first analog low pass filter signal and providing only frequency components thereof less than a second predefined frequency as said second filtered analog signal, wherein said second predefined frequency is less than said first predefined frequency; and
    a subtraction circuit receiving said first analog low pass filter signal and said second filtered analog signal and providing said first filtered analog signal as a difference thereof.

12. The circuitry of claim 10 wherein said decision circuit includes:
an analog interface circuit receiving said differentiated analog signal, said second filtered analog signal and said first integrated analog signal, said analog interface circuit converting said differentiated analog signal, said second filtered analog signal and said first integrated analog signal to logic states, each as a function of at least one corresponding analog threshold signal; and
impact dynamics discrimination circuitry including impact detection circuitry responsive to logic states of said differentiated analog signal, said second filtered analog signal and said first integrated analog signal to provide a first deployment signal therefrom.

13. The circuitry of claim 12 further including threshold circuitry providing a plurality of said analog threshold signals.

14. The circuitry of claim 13 wherein said analog interface circuit includes a first latch circuit receiving said differentiated analog signal and a first one of said plurality of analog threshold signals, said first latch circuit providing said differentiated analog signal as a first logic state if said differentiated analog signal is greater than said first analog threshold signal and otherwise providing said differentiated analog signal as a second opposite logic state.

15. The circuitry of claim 14 wherein said analog interface circuit includes a second latch circuit receiving said second filtered analog signal and a second one of said plurality of analog threshold signals, said second latch circuit providing said second filtered analog signal as a first logic state if said second filtered analog signal is greater than said second analog threshold signal and otherwise providing said second filtered analog signal as a second opposite logic state.

16. The circuitry of claim 15 wherein said analog interface circuit includes a third latch circuit receiving said first integrated analog signal and a third one of said plurality of analog threshold signals, said third latch circuit providing said first integrated analog signal as a first logic state if said first integrated analog signal is greater than said third analog threshold signal and otherwise providing said first integrated analog signal as a second opposite logic state.

17. The circuitry of claim 16 wherein said impact detecting circuitry includes:
a first logic circuit having a first input receiving said logic state of said differentiated analog signal and a second input receiving said logic state of said first integrated analog signal, and an output providing a first logic signal having a first logic state if said differentiated analog signal exceeds said first analog threshold signal prior to said first integrated analog signal exceeding said third analog threshold signal and otherwise having a second opposite logic state; and
an AND gate having a first input receiving said first logic signal, a second input receiving said logic state of said second filtered analog signal and an output providing said first deployment signal in accordance therewith.

18. The circuitry of claim 13 further including a second integration circuit receiving said first integrated analog signal and providing a second integrated analog signal therefrom;
and wherein said impact dynamics discrimination circuitry includes impact severity testing circuitry receiving said second filtered analog signal, said first integrated analog signal and said second integrated analog signal, and providing a second deployment signal therefrom.

19. The circuitry of claim 18 wherein said analog interface circuit includes a first latch circuit receiving said second filtered analog signal and a first one of said plurality of analog threshold signals, said first latch circuit providing said second filtered analog signal as first acceleration signal having a first logic state if said second filtered analog signal is greater than said first analog threshold signal, said first acceleration signal otherwise having a second opposite logic state.

20. The circuitry of claim 19 wherein said analog interface circuit includes a second latch circuit receiving said first integrated analog signal and a second one of said plurality of analog threshold signals, said second latch circuit providing said first integrated analog signal as first velocity signal having a first logic state if said first integrated analog signal is greater than said second analog threshold signal, said first velocity signal otherwise having a second opposite logic state.

21. The circuitry of claim 20 wherein said analog interface circuit includes a first comparator circuit receiving said first integrated analog signal and a third one of said plurality of analog threshold signals, said first comparator circuit providing said first integrated analog signal as second velocity signal having a first logic state if said first integrated analog signal is greater than said third analog threshold signal, said second velocity signal otherwise having a second opposite logic state.

22. The circuitry of claim 21 wherein said analog interface circuit includes a second comparator circuit receiving said first integrated analog signal and a fourth one of said plurality of analog threshold signals, said second comparator circuit providing said first integrated analog signal as third velocity signal having a first logic state if said first integrated analog signal is greater than said fourth analog threshold signal, said third velocity signal otherwise having a second opposite logic state.

23. The circuitry of claim 22 wherein said analog interface circuit includes a third comparator circuit receiving said second integrated analog signal and a fifth one of said plurality of analog threshold signals, said third comparator circuit providing said second integrated analog signal as first displacement signal having a first logic state if said second integrated analog signal is greater than said fifth analog threshold signal, said first displacement signal otherwise having a second opposite logic state.

24. The circuitry of claim 23 wherein said analog interface circuit includes a fourth comparator circuit receiving said second integrated analog signal and a sixth one of said plurality of analog threshold signals, said fourth comparator circuit providing said second integrated analog signal as second displacement signal having a first logic state if said second integrated analog signal is greater than said sixth analog threshold signal, said second displacement signal otherwise having a second opposite logic state.

25. The circuitry of claim 24 wherein said analog interface circuit includes a fifth comparator circuit receiving said second integrated analog signal and a seventh one of said plurality of analog threshold signals, said fifth comparator circuit providing said second integrated analog signal as third displacement signal having a first logic state if said second integrated analog signal is greater than said seventh analog threshold signal, said third displacement signal otherwise having a second opposite logic state.

26. The circuitry of claim 25 wherein said impact severity testing circuitry includes a first logic circuit having a first input receiving said first acceleration signal and a second input receiving said second velocity signal and an output providing a first logic signal having a first logic state if said second velocity signal is greater than said second analog threshold signal when said first acceleration signal is greater than said first analog threshold signal, said first logic signal otherwise having a second opposite logic state.

27. The circuitry of claim 26 wherein said impact severity testing circuitry includes a second logic circuit having a first input receiving said first acceleration signal and a second input receiving said second displacement signal and an output providing a second logic signal having a first logic state if said second displacement signal is greater than said sixth analog threshold signal when said first acceleration signal is greater than said first analog threshold signal, said second logic signal otherwise having a second opposite logic state.

28. The circuitry of claim 27 wherein said impact severity testing circuitry includes a third logic circuit having a first input receiving said first displacement signal and a second input receiving said first velocity signal and an output providing a third logic signal having a first logic state if said first displacement signal is less than said fifth analog threshold signal when said first velocity signal is greater than said second analog threshold signal, said third logic signal otherwise having a second opposite logic state.

29. The circuitry of claim 28 wherein said impact severity testing circuitry includes a fourth logic circuit having a first input receiving said third displacement signal and a second input receiving said third velocity signal and an output providing a fourth logic signal having a first logic state if said third velocity signal is greater than said fourth analog threshold signal when said third displacement signal is greater than said seventh analog threshold signal, said fourth logic signal otherwise having a second opposite logic state.

30. The circuitry of claim 29 further including an OR gate having a first input receiving said first logic signal, a second input receiving said second logic signal, a third input receiving said third logic signal, a fourth input receiving said fourth logic signal and an output providing said second deployment signal in accordance therewith.

31. The circuitry of claim 18 wherein said analog interface circuit includes a latch circuit receiving said first integrated analog signal and a first one of said plurality of analog threshold signals, said first latch circuit providing said first integrated analog signal as first velocity signal having a first logic state if said first integrated analog signal is less than said first analog threshold signal, said velocity signal otherwise having a second opposite logic state.

32. The circuitry of claim 31 wherein said impact dynamics discrimination circuitry includes negative velocity disable logic circuitry receiving said velocity signal and providing a third deployment signal therefrom.

33. The circuitry of claim 32 wherein said negative velocity disable logic circuitry provides said third deployment signal as a first logic signal having a first logic state if said first integrated analog signal is less than said first analog threshold signal, said first logic signal otherwise having a second logic state.

34. The circuitry of claim 32 further including an AND gate having a first input receiving said first deployment signal, a second input receiving said second deployment signal, a third input receiving an inverted representation of said third deployment signal and an output providing said airbag deployment signal in accordance therewith.

35. A method of operating a supplemental inflatable restraint system of a vehicle including an inflatable airbag, the method comprising the steps of:

sensing vehicle acceleration rate information; and deploying a supplemental inflatable restraint device if
(A) the vehicle acceleration rate information indicates a force loading rate in excess of a threshold force loading rate and the vehicle acceleration rate information contains an energy level above a predefined energy level; OR
(B) the vehicle acceleration rate information indicates a force loading rate in excess of a threshold force loading rate prior to an impact energy in excess of a first impact energy level threshold, and an impact force in excess of a first impact force threshold.

36. The method of claim 35 wherein conditional (B) further includes the conditional:
(1) AND
the vehicle acceleration rate information indicates an impact energy in excess of a second impact energy level threshold prior to an impact force in excess of a second impact force threshold.

37. The method of claim 36 wherein conditional (1) further includes the conditional OR the vehicle acceleration rate information indicates impact energy in excess of said first impact energy level threshold prior to structural displacement structural displacement less than a first structural displacement threshold.

38. The method of claim 37 wherein conditional (1) further includes the conditional OR the vehicle acceleration rate information indicates an impact force in excess of said second impact force threshold prior to structural displacement greater than a second structural displacement threshold.

39. The method of claim 38 wherein conditional (1) further includes the conditional OR the vehicle acceleration rate information indicates a structural displacement in excess of a third structural displacement threshold prior to an impact energy in excess of a third impact energy threshold.

40. The method of claim 39 wherein conditional (b) further includes the conditional:
(2) AND the vehicle acceleration rate information indicates that impact energy is detected at either of a front end of the vehicle and from an outside toward an inside of vehicle.

* * * * *